United States Patent
Müller

(10) Patent No.: US 7,506,861 B2
(45) Date of Patent: Mar. 24, 2009

(54) DISTRIBUTION DEVICE FOR TWO-PHASE CONCURRENT DOWNFLOW VESSELS

(75) Inventor: Morten Müller, Fredensborg (DK)

(73) Assignee: Morten Muller Ltd. ApS, Fredensborg (DK)

( * ) Notice: Subject to any disclaimer, the term of this patent is extended or adjusted under 35 U.S.C. 154(b) by 555 days.

(21) Appl. No.: 11/336,338

(22) Filed: Jan. 20, 2006

(65) Prior Publication Data

US 2006/0163758 A1 Jul. 27, 2006

Related U.S. Application Data

(60) Provisional application No. 60/645,914, filed on Jan. 21, 2005.

(51) Int. Cl.
*B01F 3/04* (2006.01)
(52) U.S. Cl. .................. 261/97; 261/114.1; 261/114.5
(58) Field of Classification Search .................. 261/97, 261/98, 110, 114.1, 114.2, 114.5
See application file for complete search history.

(56) References Cited

U.S. PATENT DOCUMENTS

| 5,045,247 | A | * | 9/1991 | Treese | 261/114.2 |
| 5,158,714 | A | * | 10/1992 | Shih et al. | 261/96 |
| 5,403,561 | A | * | 4/1995 | Koros et al. | 422/195 |
| 5,799,877 | A | * | 9/1998 | Gupta et al. | 239/8 |
| 5,942,162 | A | * | 8/1999 | Gamborg et al. | 261/96 |
| 6,769,672 | B2 | * | 8/2004 | Muller | 261/114.2 |
| 2006/0078483 | A1 | * | 4/2006 | Kemoun et al. | 422/188 |

* cited by examiner

*Primary Examiner*—Scott Bushey
(74) *Attorney, Agent, or Firm*—Klein, O'Neill & Singh, LLP

(57) ABSTRACT

A distribution tray for distribution of vapor and liquid across a vessel has a plurality of downcomers extending above the tray and having open upper and lower ends. A liquid conduit for each downcomer has an inlet, a section for upward liquid flow, and openings in fluid communication with the downcomer. A reduced flow area section and a device for improved liquid spread may be used at the outlet of the downcomer. During operation, vapor enters the upper downcomer end. Liquid collected on the tray flows through the inlet, upward through the conduit, and through the openings into the downcomer, where the liquid is mixed with downwardly-flowing vapor. The two-phase stream passes the reduced flow area section with increased velocity for improved dispersion of the liquid before the stream flows through the device for improved liquid spread, and then exits through the lower end of the downcomer.

44 Claims, 14 Drawing Sheets

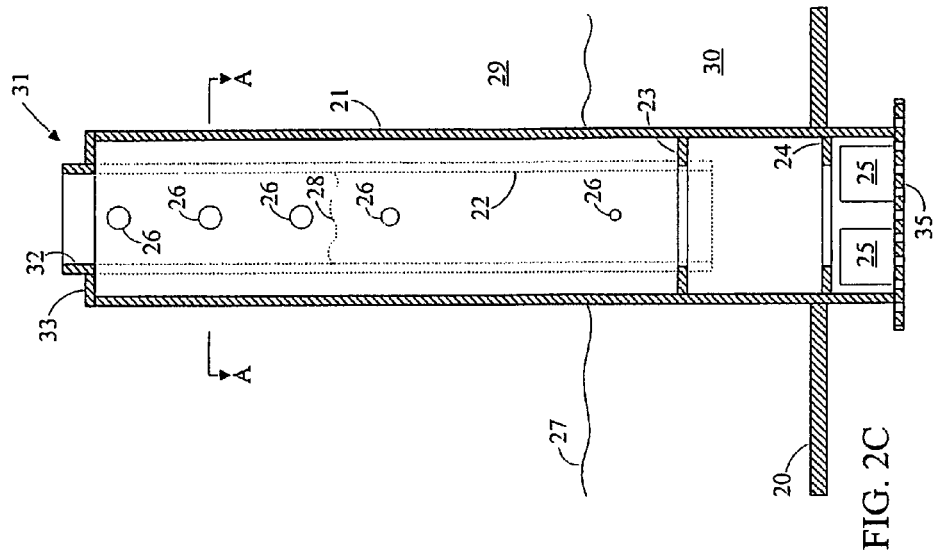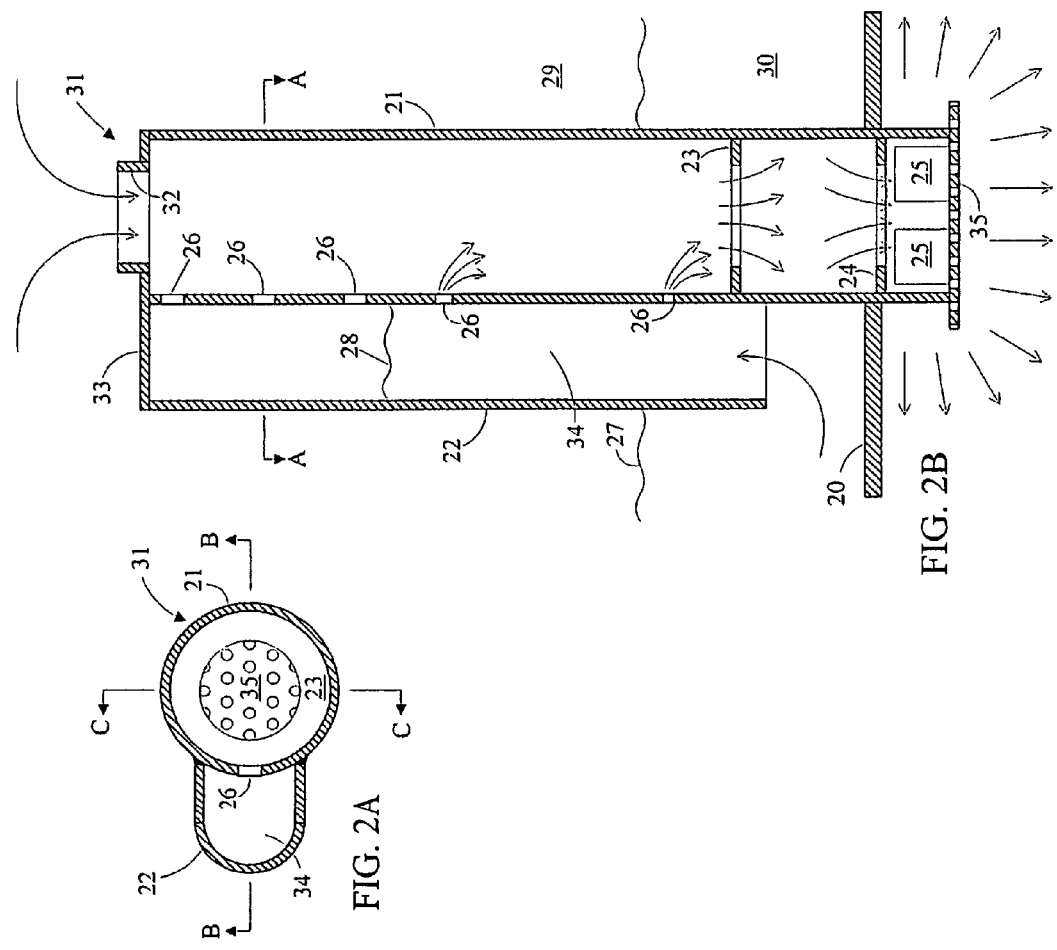
FIG. 2A
FIG. 2B
FIG. 2C

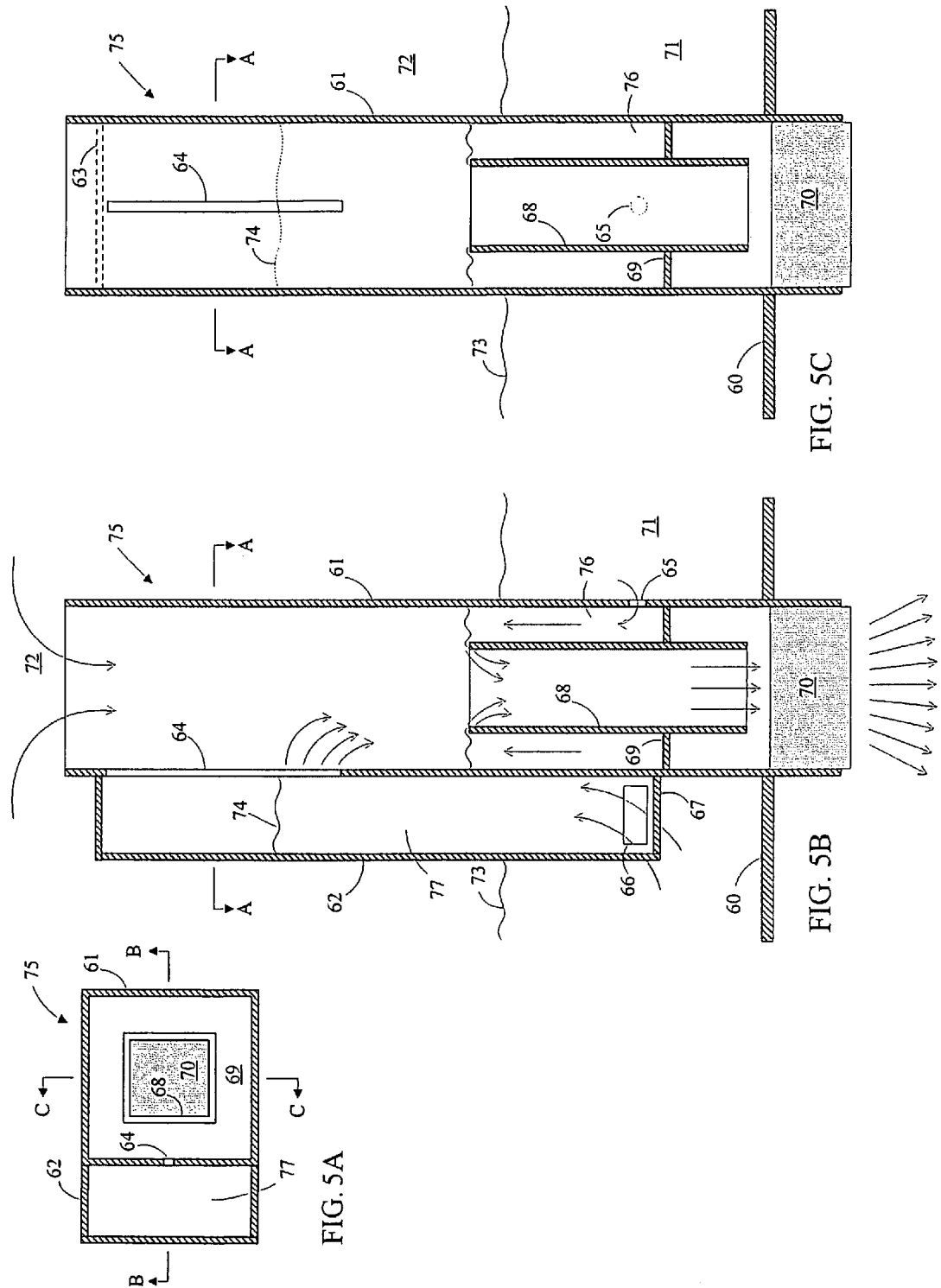

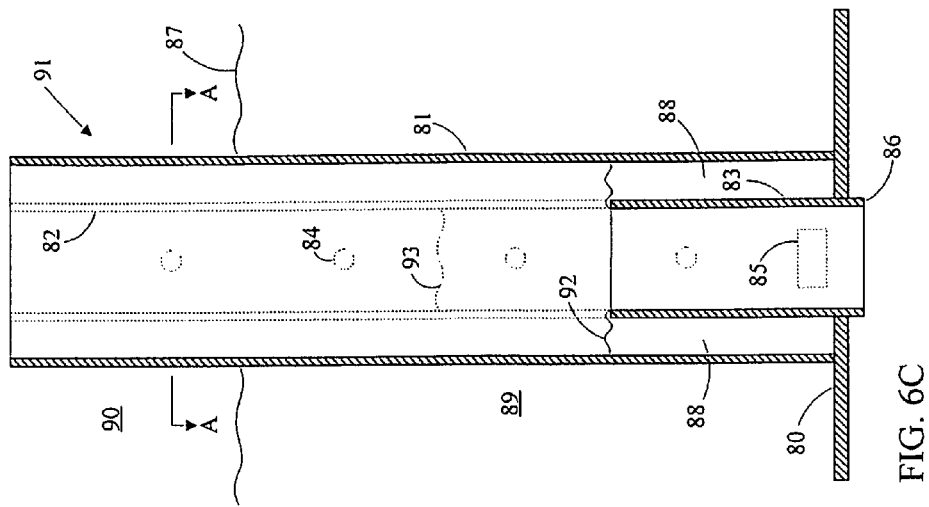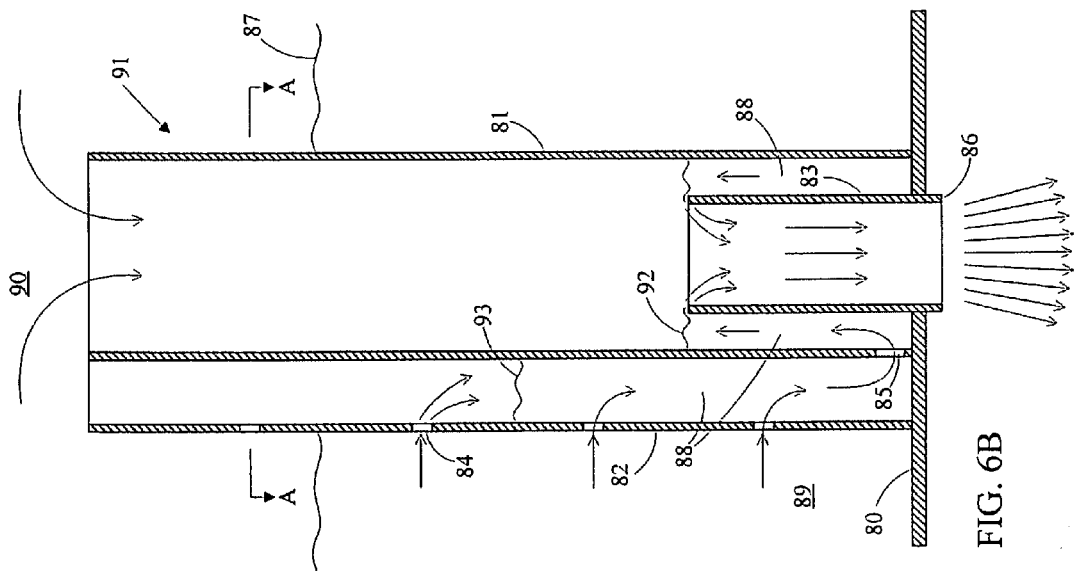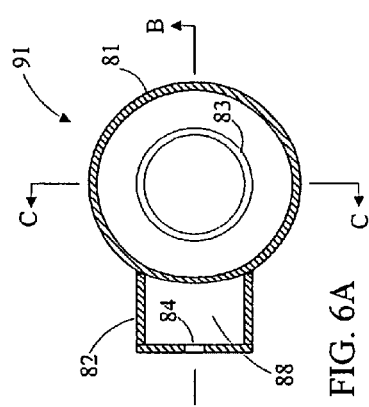

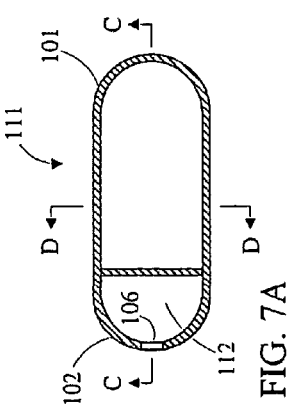
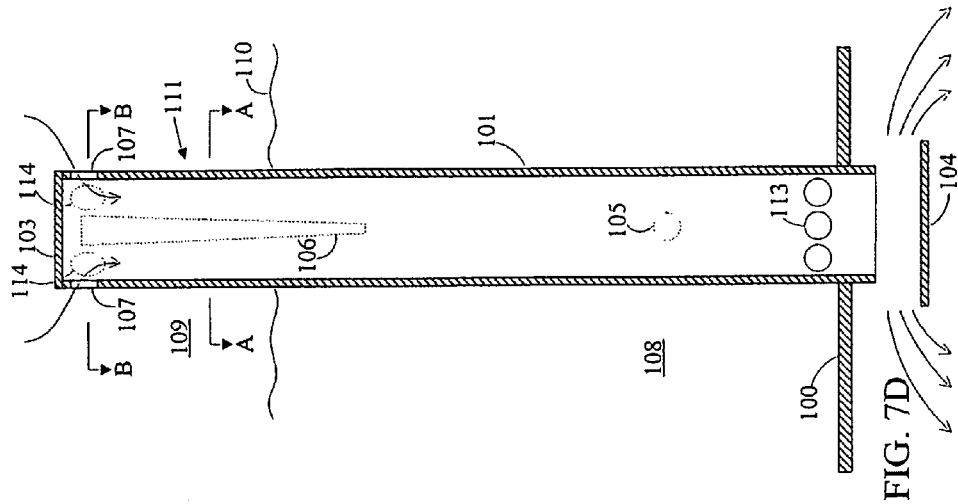
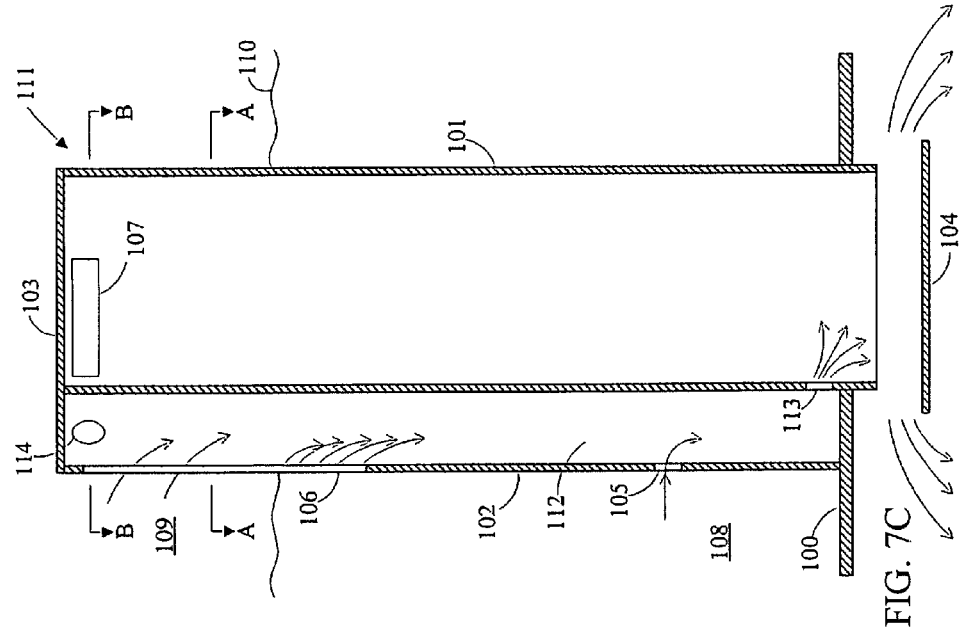
FIG. 7A  FIG. 7B  FIG. 7C  FIG. 7D

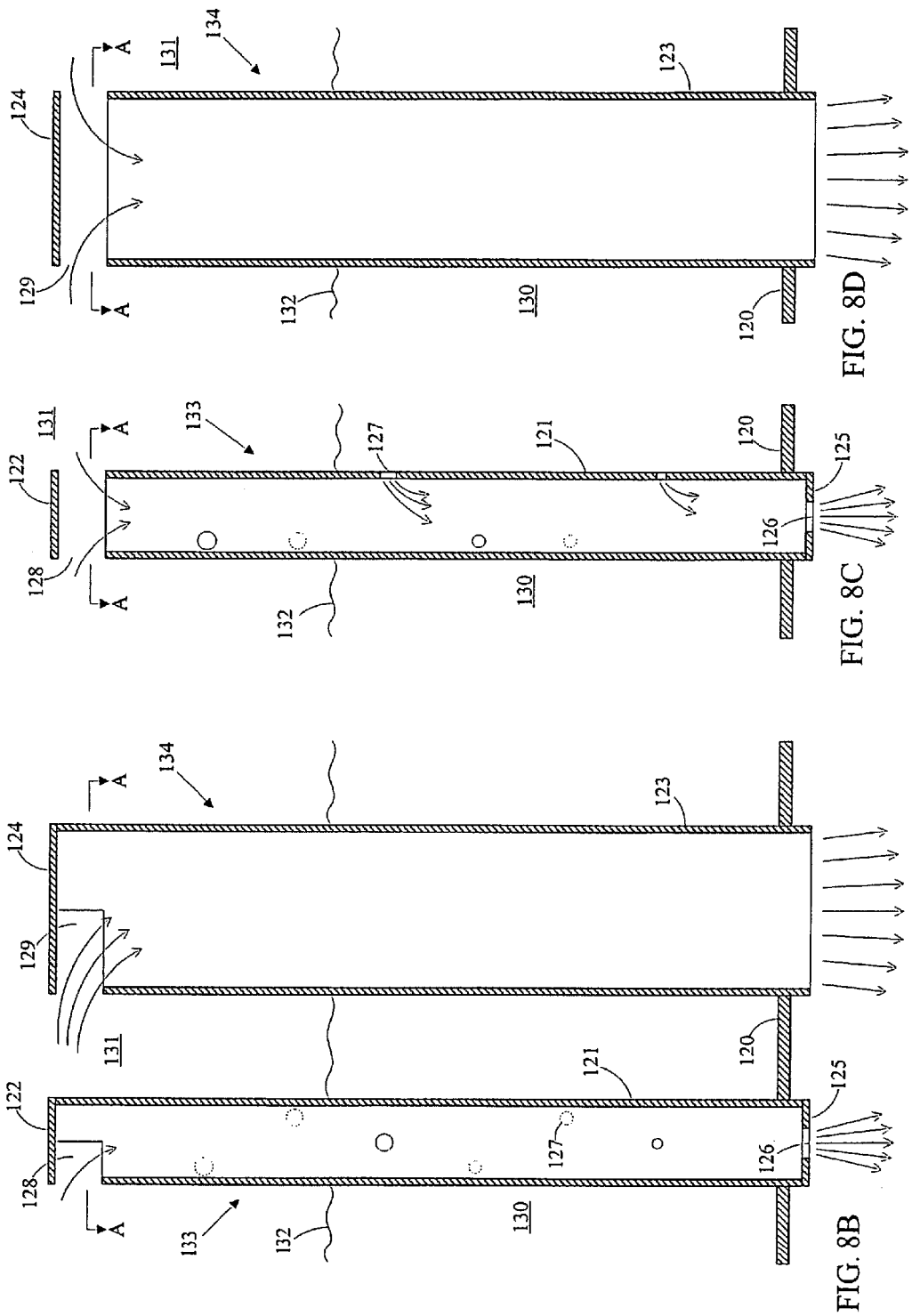

DISTRIBUTION DEVICE FOR TWO-PHASE CONCURRENT DOWNFLOW VESSELS

CROSS-REFERENCE TO RELATED APPLICATION

This application claims the benefit, under 35 U.S.C. §119 (e), of provisional application No. 60/645,914, filed Jan. 21, 2005, the disclosure of which is incorporated herein by reference.

FEDERALLY SPONSORED RESEARCH OR DEVELOPMENT

Not Applicable

BACKGROUND OF THE INVENTION

The invention relates to a device for distributing vapor and liquid uniformly over the cross section of a vessel with two-phase concurrent downflow. The invention is suited for, but not limited to, the application of distributing hydrogen-rich treatgas and hydrocarbon liquid to the catalyst bed(s) in a hydroprocessing reactor, such as a hydrotreating or hydrocracking reactor.

A large number of distribution tray designs for two-phase concurrent downflow vessels have been described in literature and patents. The majority of these designs belong to one of the two categories given below:

Chimney Type of Distribution Trays:

These distributors consist of a horizontal tray plate provided with a plurality of chimneys extending up above the tray plate. The chimneys form flow channels for vapor flow across the tray plate. For the earliest distribution tray designs liquid openings for liquid flow where provided in the tray plate. For presently used distribution tray designs one or more lateral liquid opening(s) for liquid flow are provided in the side of the chimneys. These lateral liquid opening(s) may be at one or more elevations and may vary in size and shape. The total flow area of the liquid openings is selected to hold a certain liquid level on the tray, and the total cross sectional area of the vapor chimneys is normally selected to obtain a low pressure drop across the tray to ensure that the driving force for liquid flow through the liquid openings is mainly the static head of the liquid column above the liquid opening and not the pressure drop caused by vapor flow through the chimneys.

An example of a chimney type distribution tray is given in U.S. Pat. No. 4,788,040. A predistribution tray 56 is used above a final distribution tray 66. The final distribution tray 66 is a tray provided with liquid openings/perforations 84 for liquid flow and with capped chimneys 62 for vapor flow. The chimneys 62 are also provided with lateral liquid openings 90 for liquid flow. Distribution trays with liquid openings in or close to the tray plate have shown to be susceptible to fouling and plugging since particulate impurities tend to settle out on the tray and plug the liquid openings.

Another example of a chimney type distribution tray is given in U.S. Pat. No. 4,126,540. This distribution tray consists of a tray plate 33 provided with a plurality of chimneys 31. Each chimney is provided with one or more lateral liquid openings for liquid flow 34. All liquid openings are in the elevation H above the tray plate. A perforated plate 32 is located above the chimney tray. The perforated plate has perforations 30. No perforations are provided in the plate 32 directly above the chimneys 31. In this way direct liquid flow through the upper and open end of the chimneys is prevented.

Another way of preventing direct liquid flow is by use of a chimney cap 24. This tray has improved resistance to fouling and plugging since the liquid openings are at a higher elevation and particulate impurities can therefore settle out on the tray without plugging the liquid openings. The drawback of chimney tray designs with liquid openings in one elevation only is a poor liquid flow rangeability. At low liquid flow rates the level will be at the liquid openings, and the liquid flow through each chimney becomes very sensitive to the variations in liquid depth which will always exist on the tray. At high liquid flow rates, liquid will overflow the lowest elevated chimneys and cause liquid maldistribution.

U.S. Pat. No. 5,484,578 describes a distribution system consisting of a predistribution tray 17 and a final distribution tray 18. The final distribution tray 18 is a chimney type of tray provided with a plurality of non-identical chimneys 33 and 34. The chimneys are provided with lateral liquid openings for liquid flow in one or more elevations. The chimneys 33 have one or more liquid openings at a lower elevation than the chimneys 34. In this way the liquid flow rangeability of the distribution tray is increased. The chimneys are provided with notches 38 to reduce the liquid maldistribution in case of liquid overflowing the chimneys.

Since the downward flow velocity inside the chimneys needs to be low, the exit flow pattern from the chimneys of the cited patent references is normally a low interaction flow pattern with liquid falling more or less vertically down from the drip edges of the chimneys. There is a limit on how close the chimneys can be spaced apart. With many chimneys on the tray with a close spacing, the liquid flow per chimney is low. Therefore the area of the liquid openings also needs to be reduced to still hold the desired liquid level on the tray. If the size of the liquid openings is less than about 15-30 mm$^2$, then the liquid openings become susceptible to fouling and plugging. In other words there is a maximum chimney density which should not be exceeded if plugging of liquid openings shall be avoided. For typical chimney tray designs for hydroprocessing reactors, the maximum chimney density ranges from 50 to 100 chimneys per square meter to prevent plugging of the liquid openings. Due to the limited number of distribution points or chimneys, a certain liquid spread at the exit of each chimney is desirable to avoid a point-wise liquid flow below each chimney and no liquid flow in the areas between adjacent chimneys.

U.S. Pat. No. 5,403,561 describes the use of conical spray producing means 23 in the outlet of the chimneys 24 on a chimney distribution tray 22. The spray producing means may consist of metallic ribbon wound in the form of an inverted conical helix. The conical vapor/liquid spray will ensure a good local liquid distribution from each chimney outlet. It is intended that the spray of vapor and liquid, as it impinges on the top surface of the fixed bed 18, will overlap.

A second example on how a good local liquid distribution can be achieved in the outlet from each chimney is given in U.S. Pat. No. 6,613,219. A dispersive system 28, such as a perforated plate, is used below the chimneys to spread the liquid.

A third example on improved local liquid spread in the outlet from each chimney is given in International Publication No. WO 00/53307. A flow distributing element 10 consisting of radially aligned corrugated plates 22, 22a, 22b is inserted into the outlet 12 of a chimney 14 to produce a conical spray. The small size of the flow channels between the corrugated plates makes this design prone to plugging by solid impurities.

A drawback of all the referenced chimney trays is that the total chimney area needs to be large to achieve low flow rates and pressure drop in the chimney entrance. If the pressure drop for vapor entering the chimney is excessive, then this pressure drop will increase the pressure drop across the lateral liquid openings. The result is that the liquid flow rangeability of the distribution tray is reduced: In operating cases with low liquid flow and high vapor flow the liquid level will be even lower, and in operating cases with high liquid flow and low vapor flow the liquid level will be even higher. In addition the sensitivity of the liquid flow from each chimney to variations in liquid depth across the tray is significantly increased with increased pressure drop for vapor entrance to the chimney because there is a large change in liquid flow rate when the liquid level passes a liquid opening.

In commercial applications the chimneys may occupy as much as up to 30% of the total distribution tray area. Therefore a resistance to liquid flow across the tray plate exists, and liquid level gradients on the tray may occur. The liquid level gradients will result in liquid maldistribution. The chimney caps which prevent direct liquid flow into the chimney may occupy up to 50% of the total chimney tray area in commercial designs. A significant amount of the liquid which enters the distribution tray from above will therefore hit these caps. As a consequence the liquid which hits the caps needs to flow to the rim of the cap and fall down through the vapor entering the chimney. A significant amount of the liquid may therefore be withdrawn by the vapor into the chimney and does thus by-pass the lateral liquid openings, causing liquid maldistribution.

Bubble Cap Type of Distribution Trays:

These distributors have a completely different mode of operation than the chimney type of distribution trays. While the static liquid head is the driving force for liquid distribution on the chimney distribution trays, the driving force for liquid distribution on the bubble cap tray is the vapor flow. The bubble cap distributor consists of a horizontal tray plate. A plurality of distribution units or bubble caps is provided for vapor and liquid flow across the tray plate. Each bubble cap is an inverted U-shaped flow conduit consisting of upflow channel(s) and downflow channel(s). The lower part of each upflow channel is provided with one or more lateral vapor openings, typically vertical slots or inverted V-notches. Each downflow channel extends through the tray plate. The vapor passes through the lateral vapor openings in the lower part of each upflow channel and thereby generates a pressure drop from the vapor space above the tray to the inside of the upflow channel. Due to this pressure drop, liquid is lifted up into the upflow channel, mixed with the vapor and the two-phase mixture flows up through the upflow channel, over an internal weir and down through the downflow channel, and exits the distribution unit below the tray.

An example of a traditional bubble cap distribution tray is given in U.S. Pat. No. 3,218,249. The distribution tray consists of a tray plate 18 provided with a plurality of cylindrical downcomers 26 which serve as downflow channels. A cap 28 overlays each downcomer, and thus forms an annular upflow channel between the cap and downcomer. The cap is provided with slots, as indicated in FIG. 6. During operation, a liquid level will build up on the tray to a level intermediate the slots. Vapor will pass through the dry upper section of the slot. A pressure drop is therefore generated from outside the cap to inside the annular upflow channel. Due to this pressure drop, liquid is lifted from the liquid pool on the tray up into the annular upflow channel where it is mixed with the vapor. The two-phase stream first flows upward through the annular upflow channel, then the stream takes a 180° turn over the internal weir, consisting of the upper edge of the downcomer, and finally the two-phase stream flows downward through the downcomer and exits the bubble cap below the tray plate 18.

The downcomer and cap of the bubble cap distribution unit may have many different shapes and layouts, as illustrated in U.S. Pat. No. 5,942,162, where square and rectangular shapes of the cap and the downcomer are suggested in addition to the circular shape.

The bubble cap distributor has three major performance problems:

1. The liquid flow from each distribution unit is very sensitive to variations in liquid depth across the tray plate. This is especially true in applications with high vapor load.
2. In order to reduce the performance problem due to sensitivity to variations in liquid depth across the tray plate, the bubble cap distributors need to be designed with two-phase flow velocities inside the devices that are as low as possible. Since the vapor and liquid flow rates in the downflow vessel are fixed by other parameters, the available flow areas in the bubble cap, the upflow area, the flow area over the internal weir, and the downflow area need to be maximized to achieve the desired low two-phase flow velocities. Therefore the bubble caps occupy a large fraction of the total area of the distribution tray plate. In commercial designs up to about 50% of the tray area may be occupied by the bubble caps, and at the same time the liquid level is low, typically only 50-100 mm. As a result, the horizontal liquid flow velocity between adjacent bubble caps due to liquid flowing across the tray plate is high, and consequent large liquid level gradients on the tray may occur due to the frictional loss. The liquid level gradients will result in further liquid maldistribution. The resistance to liquid cross flow and thus the liquid level gradients are larger for bubble caps with a rectangular cross section than for bubble caps with a round cross section due to a larger frictional loss.
3. Pressure gradients exist in the vapor space above the distribution tray. The liquid flow from each bubble cap is sensitive to these pressure differences.

U.S. Pat. No. 6,769,672 describes a bubble cap type distribution tray with significantly reduced sensitivity of the liquid flow from each bubble cap to variations in liquid depth across the tray plate. The improved bubble cap has two different types of upflow channels: upflow channels 16 with high vapor flow but low liquid flow, and upflow channels 15 with low vapor flow and high liquid flow. However the bubble caps still occupy a large fraction of the tray area, and liquid level gradients due to liquid flow across the tray are still a concern.

As mentioned, the two-phase flow velocities in the bubble caps must be kept as low as possible. This is in order to reduce the frictional pressure loss in the bubble cap. A low frictional pressure loss results in reduced sensitivity of liquid flow from each bubble cap towards the unavoidable variations in liquid depth across the tray. For this reason, attempts to improve the local distribution or spread of liquid at the outlet of each bubble cap by use of different inserts for liquid dispersion has failed. One example of such an attempt is given in U.S. Pat. No. 5,158,714. The inserts will represent a flow restriction and will increase the frictional pressure loss. As a consequence, bubble caps with inserts or other flow restrictions show significantly increased sensitivity of liquid flow from each bubble cap to variations in liquid depth across the tray, which again results in a poor tray-wide liquid distribution. A poor tray-wide liquid distribution can not be compensated by an improved local liquid spread at the bubble cap outlets.

Criteria for Proper Performance of a Distribution Tray

The following criteria must be fulfilled by a proper distribution tray:

A) There must be close to identical liquid flow rates from each of the distribution units on the distribution tray regardless of variations in liquid depth on the tray. The sensitivity to variations on liquid depth is quantified as the liquid maldistribution due to ½ inch "out-of-level" conditions, % $Mal^{1/2\ inch}$:

$$\%Mal^{1/2inch} = \frac{2 \times abs[Q_l^{low} - Q_l^{high}]}{Q_l^{low} + Q_l^{high}} \times 100\% \qquad (1)$$

Where:
% $Mal^{1/2\ inch}$ Is the percent liquid maldistribution due to ½ inch "out-of-level" conditions.
$Q_1^{high}$ Is the liquid volumetric flow through one distribution unit elevated ¼ inch higher than average, m³/s.
$Q_1^{low}$ Is the liquid volumetric flow through one distribution unit elevated ¼ inch lower than average, m³/s.

Variation in liquid depth from distribution unit to distribution unit (out-of-level conditions) will always exist in commercial hydroprocessing units since:

1) The support ring, and thus the tray plate, is not in perfect level; see FIG. 10.
2) The tray plate and/or the tray support beams will deflect due to the load.
3) There are offsets in elevation of each individual distribution unit on the tray due to fabrication tolerances.
4) The liquid surface will be wavy due to the quite turbulent conditions above the distribution tray and due to liquid falling down from above.
5) There are often significant liquid level gradients on the tray due to liquid flowing across the tray. Often a radial flow from vessel centerline towards the vessel wall exists.

A typical level difference in commercial reactors due to fabrication and installation tolerances (above points 1, 2 and 3) is about 0.5 inch.

B) There shall be many distribution units per m2 of tray area. With about 90 distribution units per m² the liquid spread caused by a 200 mm thick layer of 1 inch diameter inert balls, located below the distribution tray, results in a uniform liquid distribution at the outlet of this inert particle layer which is typically the inlet to the active catalyst bed in a catalytic reactor. If means for improved local spread of the liquid exiting each distribution unit are used, then less than 90 distribution units per m² may be acceptable. The coverage of the catalyst bed with distribution units shall be as uniform as possible. There shall not be areas near the reactor wall, thermowells or support structures, which are not covered by distribution units.

C) The distributor needs to be resistant to fouling, such as scales and particles. Such solid impurities will always be present in commercial applications.

D) Some liquid will pass with the vapor phase and will take the vapor path through the distribution unit. The liquid maldistribution caused by this effect shall be minimized.

E) Liquid entering the distribution tray is not evenly distributed. Some areas of the distribution tray receive large amounts of liquid, while other areas may not receive any liquid at all; see FIG. 11. Therefore it is important that liquid can flow across the tray from one area to another without creating excessive liquid level gradients.

F) Pressure gradients in the vapor space above the distribution tray exist since the kinetic energy of the high velocity exit streams from an inlet diffuser or an inter-bed mixer is converted into a pressure rise, so that the pressure near the reactor wall is typically higher than the pressure near the reactor center; see FIG. 12. A typical pressure difference in commercial reactors is about 50 Pa. There must be close to identical liquid flow rates from each of the distribution units on the distribution tray regardless of these pressure differences. The sensitivity to pressure differences is quantified as the liquid maldistribution due to a 50 Pa pressure difference in the vapor space above the distribution tray:

$$\%Mal^{50Pa} = \frac{2 \times abs[Q_l^{hp} - Q_l^{lp}]}{Q_l^{hp} + Q_l^{lp}} \times 100\% \qquad (2)$$

Where:
% $Mal^{50\ Pa}$ Is the percent liquid maldistribution due to 50 Pa pressure difference.
$Q_1^{hp}$ Is the liquid volumetric flow through one distribution unit exposed to a 25 Pa higher than average inlet pressure in the vapor space, m³/s.
$Q_1^{lp}$ Is the liquid volumetric flow through one distribution unit exposed to a 25 Pa lower than average inlet pressure in the vapor space, m³/s.

Note that a pressure difference in the vapor space above the distribution tray causes a level difference as well. In the areas with low pressure, the level will rise, and in the areas with high pressure, the level will drop; see FIG. 12. % $Mal^{50\ Pa}$ is the liquid maldistribution resulting from the combined pressure and level effect.

SUMMARY OF THE INVENTION

The invention represents a new family of distribution trays for two-phase concurrent downflow vessels which has been developed to fulfill all six criteria for proper performance of a distribution tray listed above.

The present invention combines principles from both the chimney type of distribution trays and the bubble cap types of distribution trays. The driving force for liquid distribution of the present invention is thus a combination of the static head of a liquid column on the tray and the vapor flow through the device.

One layout of the distribution tray consists of a tray plate with a plurality of downcomers extending up above the tray plate. The downcomers have open upper ends in fluid communication with the vapor space above the tray and open lower ends communicating with the space below the tray. The downcomers serve as channels for passing the vapor and liquid through the tray. A liquid conduit is also provided for each downcomer with a liquid inlet submerged in the liquid pool on the tray, with a section for upward flow of liquid and with liquid openings at more elevations in fluid communication with the downcomer. The liquid conduit is used to transfer liquid from the liquid pool into the downcomer. The lower end of the downcomer is provided with means for improving the local liquid spread from each downcomer such as vanes, baffles, ribbons, corrugated, flat or curved plates with or without perforations.

The majority of the vapor flows through the upper and open end of the downcomer and thereby generates a pressure drop due to friction and due to acceleration. This pressure drop is utilized to lift the liquid up into the liquid conduit through the liquid inlet. The liquid level in the liquid conduit is above some or all of the liquid openings, and liquid therefore flows through the liquid openings and into the downcomer where it is mixed with the downward flowing vapor. The two-phase mixture flows down through the downcomer and passes through the means for improving the liquid spread before it exits the downcomer.

The distribution tray has significantly improved distribution performance in terms of keeping close to identical liquid and vapor flow through all distribution units on the tray regardless of variations in liquid depth or vapor inlet pressure across the tray plate for a large range of both liquid and vapor flow rates. Due to the initial upward flow direction of the liquid in the liquid conduit, scale and particles tend to settle out upstream from the liquid openings. Therefore the distributor is less susceptible to fouling and plugging than a conventional chimney tray. The distribution unit, consisting of the downcomer and the liquid conduit, is very compact and the distribution units only occupy a small fraction of the tray area. Therefore the resistance to liquid flow across the tray is low, and the amounts of liquid by-passing the liquid openings through the vapor inlets are much lower than for a conventional chimney tray.

BRIEF DESCRIPTION OF THE DRAWINGS

FIGS. 2A, 2B, 2C and 3 represent an example of a first embodiment of a distribution tray of the present invention. FIG. 2A is a sectional view from above of one embodiment of the invention taken along the segment A-A. FIG. 2B is a side sectional view taken along the segment B-B of FIG. 2A. Arrows in FIG. 2B indicate the fluid flow path through the distribution unit. FIG. 2C is a side sectional view taken along the segment C-C of FIG. 2A. FIG. 3 is a simplified sectional view from above of a section of the distribution tray showing five distribution units on a triangular pitch.

FIG. 4A is a side sectional view of a low velocity chimney of the prior art. FIG. 4B is a side sectional view of a high velocity chimney of the prior art. FIG. 4C is a side sectional view of a bubble cap distribution unit of the prior art.

FIGS. 5A, 5B and 5C represent an example of a second embodiment of a distribution unit of the present invention. FIG. 5A is a sectional view from above of the distribution unit taken along segment A-A of FIGS. 5B and 5C. FIG. 5B is a side sectional view of the distribution unit taken along the segment B-B of FIG. 5A. Arrows in FIG. 5B indicate the fluid flow path through the distribution unit. FIG. 5C is a side sectional view of the distribution unit taken along the segment C-C of FIG. 5A.

FIGS. 6A, 6B and 6C represent an example of a third embodiment of a distribution unit of the present invention. FIG. 6A is a sectional view from above of the distribution unit taken along segment A-A of FIGS. 6B and 6C. FIG. 6B is a side sectional view of the distribution unit taken along the segment B-B of FIG. 6A. Arrows in FIG. 6B indicate the fluid flow path through the distribution unit. FIG. 6C is a side sectional view of the distribution unit taken along the segment C-C of FIG. 6A.

FIGS. 7A, 7B, 7C and 7D represent an example of a fourth embodiment of a distribution unit of the present invention.

FIG. 7A is a sectional view from above of the distribution unit taken along segment A-A of FIGS. 7C and 7D. FIG. 7B is a sectional view from above of the distribution unit taken along segment B-B of FIGS. 7C and 7D. FIG. 7C is a side sectional view of the distribution unit taken along the segment C-C of FIGS. 7A and 7B. FIG. 7D is a side sectional view of the distribution unit taken along the segment D-D of FIGS. 7A and 7B. Arrows in FIGS. 7C and 7D indicate the fluid flow path through the distribution unit.

FIGS. 8A, 8B, 8C, 8D and 9 represent an example of a fifth embodiment of a distribution tray of the present invention. FIG. 9 is a simplified view from above of a section of the distribution tray. FIG. 8A is a sectional view from above of the tray section indicated with a doted line in FIG. 9. FIG. 8B is a side sectional view of the tray section taken along the segment B-B of FIG. 8A. FIG. 8C is a side sectional view of the liquid conduit taken along the segment C-C of FIG. 8A. FIG. 8D is a side sectional view of the downcomer taken along the segment D-D of FIG. 8A. Arrows in FIGS. 8B, 8C and 8D indicate the fluid flow path through the distribution units.

DETAILED DESCRIPTION OF THE INVENTION

Figure 1:
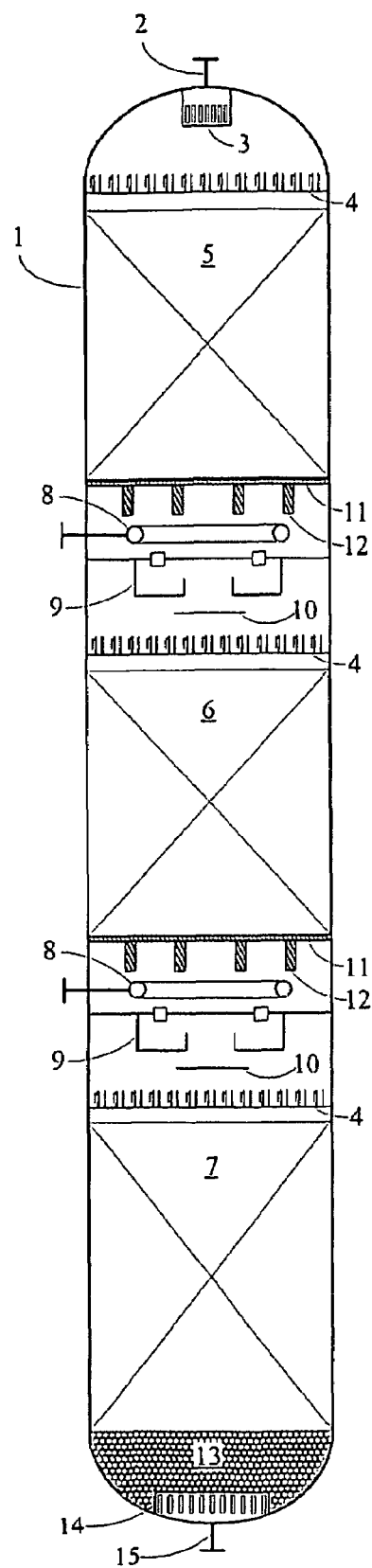
FIG. 1 is a schematic representation of a typical reactor with three catalyst beds for hydroprocessing of hydrocarbon fractions.

In commercial hydroprocessing reactors, the two-phase mixture of reactants flows concurrently downward through a fixed bed of solid catalyst particles. The ideal flow pattern in such a reactor is plug flow where liquid flows downward with the same velocity (based on empty reactor) at all points of the reactor cross-section. In the ideal plug flow case the same is true for the vapor phase: The vapor flows downward with identical velocity (based on an empty reactor) at all points of the reactor cross-section.

In commercial reactors plug flow is never achieved due to non-ideal distribution trays, uneven catalyst loading and/or the presence of deposits in the void space between the catalyst particles. Therefore, in some areas of the catalyst bed, the liquid flow velocity is higher than average, and the vapor velocity is lower than average. Due to the high heat capacity of the liquid relative to the vapor, the temperature rise in ° C. per meter of flow path is low in these areas. Similarly, in other areas of the catalyst bed, the liquid flow velocity is lower than average, and the vapor velocity is higher than average. Again, due to the high heat capacity of the liquid relative to the vapor, the temperature rise in ° C. per meter of flow path is high in these areas.

As a result, even though the reactant mixture has a uniform temperature at the reactor inlet, some areas of the catalyst bed get hotter than others as the fluids are passing through the bed. Further, since the rate of reaction increases with increasing temperature, this effect tends to accelerate: The hot areas of the catalyst bed have high rates of reaction, and even more heat is therefore released in these areas than in the cold areas.

Due to the difference in rate of reaction between the hot areas and cold areas of the catalyst bed, differences in the chemical composition of the fluids are also developed.

The non-uniformity in temperature and chemical composition in a horizontal plane has several negative effects:

All hydroprocessing catalysts deactivate during operation. In order to compensate for the decline in activity of the catalyst, the average bed temperature is increased during the run. At some point in time, at end-of-run, the peak temperature in the catalyst bed reaches its maximum allowable value. At this point, the entire process unit needs to be shut down, and the catalyst must be regenerated or replaced. Now if there is non-uniformity in temperature in the horizontal plane, the end-of-run will occur at an earlier stage and at a lower average bed temperature. The higher frequency of shut-downs caused by non-uniform temperatures has a high cost to the refiner in terms of lost production, higher catalyst consumption and additional labor.

Another effect of the non-uniformities is that the degree of chemical conversion is uneven. A first fraction of the reactants will be converted to a high extent, while the remaining fraction of the reactants is converted to a lower extent. The result is often lower overall product quality.

A first example is a diesel hydrotreating reactor where sulfur-containing hydrocarbon components and $H_2$ is converted to sulfur-free hydrocarbon components and $H_2S$. If non-uniform temperatures exist, then a fraction of the feed oil is reacted at higher temperature and maybe also at lower space velocity due to lower liquid velocity as discussed above. Another fraction of the feed oil is reacted at a lower temperature and maybe also higher space velocity due to higher liquid velocity. The result is that the organic sulfur tends to "by-pass" the catalyst bed through the areas with low temperature and high space velocity. This by-pass significantly increases the content of organic sulfur in the overall product. In order to meet the product specification on organic sulfur content, the refiner needs to reduce the feed rate or increase the reactor operating temperature to compensate for the non-uniform temperatures and composition. Reducing the feed rate has a significant cost in terms of lost production. Increasing the reactor temperature results in increased energy consumption and reduced run length with increased frequency of shutdowns for catalyst generation/replacement. The increased frequency of shutdowns has significant costs as discussed above.

A second example is a hydrocracking reactor where heavier hydrocarbon components and $H_2$ are converted to lighter hydrocarbon components. Again if non-uniform temperatures exist, then a fraction of the feed oil is reacted at higher temperature and maybe also at lower space velocity due to lower liquid velocity. Another fraction of the feed oil is reacted at lower temperature and maybe also higher space velocity due to higher liquid velocity. The result is that part of the heavy feed oil is "overcracked" so that the production of unwanted $C_1$-$C_4$ gasses and light naphtha components is significantly increased while another part of the heavy feed oil is only converted to a low extent. The selectivity of the hydrocracking reactions toward the desired product is thus reduced, and the overall conversion of the heavy feed components to lighter product components is also reduced. Both effects are associated with significant costs to the refiner.

Non-uniformities in temperature and chemical composition in the horizontal plane of a catalyst bed are unavoidable in commercial hydroprocessing reactors. However the non-uniformities can be minimized by using suitable reactor internals, such as distribution trays and inter-bed mixing devices.

Now referring to FIG. 1, there is shown a typical reactor with reactor internals and with three fixed beds of catalyst for hydroprocessing of hydrocarbon fractions and with injection of quench fluid for control of the inlet temperature to the second and third catalyst beds. FIG. 1 is intended to define the typical location of the distribution tray relative to the catalyst beds and to other reactor internals.

The reactor comprises a pressure shell 1 having a vapor/liquid inlet nozzle 2. The high velocity of the inlet stream is broken down in an inlet diffuser 3 in order to prevent the high velocity inlet jet from impinging on the distribution tray, which would result in liquid re-entrainment, waves and pressure gradients. Below the inlet diffuser, a first distribution tray 4 is located to distribute the vapor and liquid evenly over the reactor cross section before the fluids enter a first catalyst bed 5. The first catalyst bed 5 is supported by a first catalyst screen or support grid 11. Normally large forces are acting on the first support grid 11, and support beams 12 are therefore often required to absorb these forces. Quench fluid may be added through a first quench nozzle and distributor 8 to the vapor and liquid exiting the first catalyst bed 5. The vapor and liquid mixture now flows through a first inter-bed mixer 9 where the temperature and composition of the stream are equilibrated. A first impingement device 10 is located at the mixer outlet to ensure that the high velocity of the mixer exit stream is broken down in order to prevent the high velocity jet from impinging on the first distribution tray 4, which would result in liquid re-entrainment, waves and pressure gradients. The two-phase stream now enters a second distribution tray 4 which distributes the vapor and liquid evenly over the reactor cross section before the fluids enter a second catalyst bed 6.

The second catalyst bed 6 is supported by a second catalyst screen or support grid 11. Normally large forces are acting on the second support grid 11, and support beams 12 are therefore often required to absorb these forces. Quench fluid may be added through a second quench nozzle and distributor 8 to the vapor and liquid exiting the second catalyst bed 6. The vapor and liquid mixture now flows through a second inter-bed mixer 9 where the temperature and composition of the stream are equilibrated. A second impingement device 10 is located at the mixer outlet to ensure that the high velocity of the mixer exit stream is broken down in order to prevent the high velocity jet from impinging on the second distribution tray 4, which would result in liquid re-entrainment, waves and pressure gradients. The two-phase stream now enters a third distribution tray 4 which distributes the vapor and liquid evenly over the reactor cross section before the fluids enter a third catalyst bed 7.

The third catalyst bed 7 rests on inert support material 13 in the bottom of the pressure shell 1. An outlet collector is used at the reactor outlet as a catalyst/inert particle screen and to achieve uniform flow distribution in the bottom of the third bed 7. The vapor and liquid flow through an outlet collector 14 and exits the reactor through an outlet nozzle 15.

More or fewer catalyst beds than three may also be employed. The total number of distribution trays in a reactor often equals the number of catalyst beds. Pre-distribution trays for scale collection and for rough liquid distribution (not shown in FIG. 1) may be used upstream of any of the distribution trays 4. The use of pre-distribution trays reduces the liquid level gradients and liquid splashing on the distribution trays 4, it normally reduces the pressure gradients in the vapor space above the distribution trays 4, and it reduces the likelihood of plugging the distributors on the distribution trays 4 by solid impurities. However, pre-distribution trays take up additional reactor height.

FIGS. 2A-C, 3, 5A-C, 6A-C, 7A-D, 8A-D, and 9 represent alternative structures of the distribution tray according to the present invention. The figures are presented only to characterize the invention and alternatives. They are not intended to limit the scope of the concepts disclosed herein or to serve as working drawings. They should not be construed as setting limits on the scope of the inventive concept. The relative dimensions shown by the drawings should not be considered equal or proportional to commercial embodiments.

Figure 3:
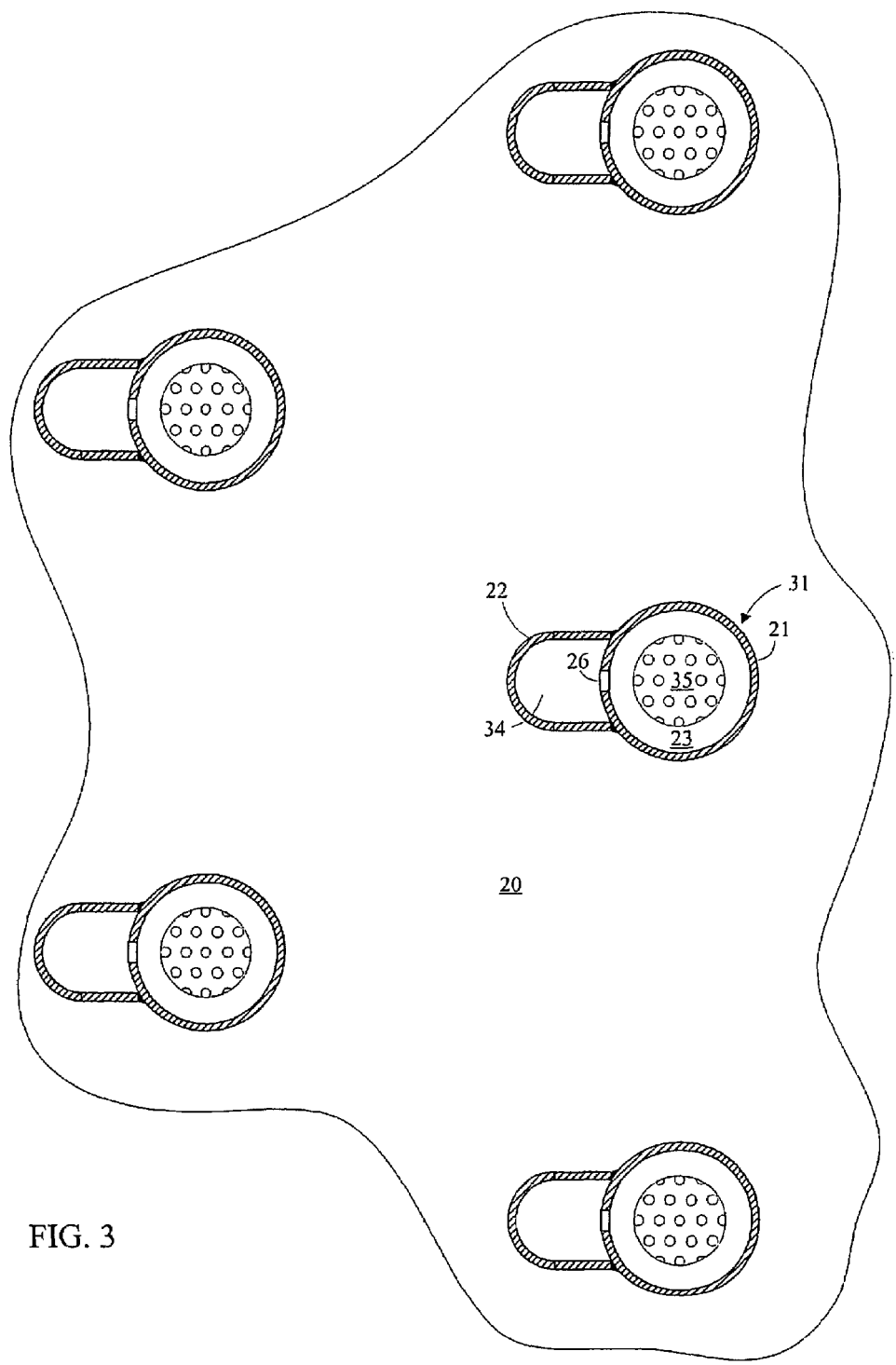

One embodiment of a distribution tray of the present invention is shown in FIGS. 2A, 2B, 2C and 3. FIG. 2A is a sectional view from above of the distribution unit taken along segment A-A. FIG. 2B is a side sectional view of the distribution unit taken along the segment B-B of FIG. 2A. Arrows in FIG. 2B indicate the fluid flow path through the distribution unit. FIG. 2C is a side sectional view of the distribution unit taken along the segment C-C of FIG. 2A. FIG. 3 is a simplified sectional view from above of a section of the distribution tray showing the layout of the distribution units on the tray plate.

The distribution tray comprises a tray plate 20 provided with many identical distribution units 31 on a uniform triangular pitch. The tray plate 20 is typically assembled from several tray segments, where each tray segment is able to pass through the reactor manway nozzle. The tray plate 20 is typically provided with a manway near the center of the reactor to provide a passageway for personnel and equipment during catalyst loading and inspection. Support structures, such as a support ring welded to the inner vessel wall and support beams, are normally required to support the tray plate. The tray plate 20 is provided with a plurality of holes on a triangular pitch. One circular downcomer 21 is fitted down through each hole.

Optionally a reduced flow area section may be provided inside the downcomer, such as the reduced flow area section consisting of two circular orifices 23 and 24 concentric with the downcomer 21. Four rectangular cuts 25 are provided in the lower edge of downcomer 21. A perforated plate 35 is mounted below the downcomer 21. Other means for providing a reduced flow area section and improved liquid spread at the downcomer outlet may be used, such as vanes, baffles, ribbons, packing, corrugated, flat or curved plates with or without perforations.

Optionally the vapor entrance to the downcomer has a reduced flow area section, such as the reduced flow area section consisting of the circular pipe piece 32 concentric with downcomer 21.

A liquid conduit is made of a side wall 22 and a top wall 33, which are attached to the outer wall of the downcomer 21. Liquid openings 26 are provided at more elevations to form a fluid passageway from the liquid conduit into the downcomer.

The joints between the tray plate 20 and the downcomer 21, between the side wall 22 and the downcomer 21, between the top wall 33 and the side wall 22, between the top wall 33 and the downcomer 21, and between the top wall 33 and the pipe piece 32 are pressure-tight.

During operation, liquid will be collected in a liquid pool 30 on the tray plate 20, and a vapor phase 29 will exist above the liquid pool 30. Due to the turbulent conditions above the tray plate, the phase separation will normally not be complete, meaning that some vapor bubbles exist in the liquid and that liquid droplets exist in the vapor. The vapor flows through the pipe piece 32 and into the downcomer 21 at relatively high velocity compared to traditional chimney tray designs. A pressure drop from the outside to the inside of the downcomer 21 is therefore generated. This pressure drop is utilized to lift the liquid from the pool 30 up into the liquid conduit 34 so that the liquid level 28 in the liquid conduit 34 normally is higher than the liquid level 27 on the tray plate 20, depending upon the frictional loss for liquid entrance and flow in the liquid conduit. The liquid in the liquid conduit first flows upward and then through the fraction of the liquid openings 26 which are elevated at or below the liquid level 28 in the liquid conduit. The liquid from the liquid openings then enters the downcomer 21 where it is mixed with the downward-flowing vapor inside the downcomer before the fluids enter the reduced flow area section consisting of the orifices 23 and 24, where the flow velocity is increased for better liquid dispersion. The dispersed two-phase mixture is then spread by the perforated plate 35 and through the four openings 25. A fraction of the fluid stream passes through the perforations in the plate 35 in a vertical direction while the remaining fluid passes through the openings 25 in a horizontal direction. The holes in the perforated plate 35 are sufficiently small to prevent the high velocity jet from moving the particles located below the distribution tray.

The distribution unit 31 is normally designed so that the liquid level 27 on the tray is between the lower edge of the side wall 22 and the upper edge of the pipe piece 32 for all operating cases (i.e. for all relevant combinations of vapor and liquid flow).

The distributor dimensions, which are normally adjusted to achieve this, include: the size, number and elevation of the liquid openings 26, the cross-sectional area of the liquid conduit 34, the cross sectional area of the downcomer 21, and the cross sectional area of the pipe piece 32.

The distribution performance of the present invention is improved with increased tray pressure drop, as explained below. The cross-sectional area of the reduced flow area section, consisting of the orifices 23 and 24, and the means for improved liquid spread, consisting of the openings 25 and the perforated plate 35, are normally sized to achieve an acceptable overall tray pressure drop and to achieve dispersion of the liquid. An excessively high tray pressure drop will add a large load to the tray plate during operation, which will require stronger tray supports, it will increase the undesirable liquid leakage flow through joints between tray segments, and it will make the mechanical design of the tray more complicated. An excessively high tray pressure drop will also add to both the initial cost and the operating cost of the process unit. The initial cost is increased due to the requirement for stronger support structures for the distribution tray and due to increased design pressure of upstream equipment. The operating cost is increased due to an additional energy requirement for pumps and compressors feeding gas or vapor and liquid to the reactor.

There are two main reasons for improved performance in terms of low maldistribution, as defined in equation (1), of the present invention relative to a traditional chimney tray such as the one described in U.S. Pat. No. 5,484,578:

Reason 1: Due to the liquid seal function of the liquid conduit 34, there is only very low or no vapor flow through the liquid openings 26 which are located at or above the liquid level 28 inside the liquid conduit. Therefore, the pressure at the liquid surface 28 is close to the pressure inside the downcomer at same elevation. As a result, the driving pressure drop for liquid flow through a liquid opening 26 is mainly the static pressure of the liquid column inside the liquid conduit which is above the liquid opening. This is unlike a traditional chimney tray, where the driving force is both the liquid height above the lateral liquid opening plus the pressure drop for vapor entrance to the chimney. The result is that the stepwise change in liquid flow when the liquid level 28 is increased or reduced and thereby is passing a liquid opening 26 is not as large for a distribution unit of the present invention as for a traditional chimney tray.

Reason 2: If we consider a distribution unit of the present invention which is elevated lower than a high distribution unit on the same tray, the liquid levels 27 and 28 will be higher relative to that distribution unit. Therefore, there is a higher liquid column above the liquid openings (more driving force for liquid flow through the openings) and maybe also a larger area of liquid openings available for liquid flow (below the surface 28). The low distribution unit will thus pass more liquid than the high distribution unit. However since the low and the high distribution units are located on the same tray plate, the total pressure drop through each of the two distribution units needs to be identical. A significant fraction of the tray pressure drop is in the reduced flow area section in the orifices 23 and 24 and in the means for improved liquid spread, the openings 25 and the perforated plate 35. For the low distribution unit, the larger liquid flow rate through these sections results in an increased pressure drop. In order to compensate, the low distribution unit will pass less vapor than the high distribution unit, so that the pressure drops through the two units equal each other. The reduced vapor flow through the low unit results in reduced pressure drop for vapor entrance to downcomer 21 and thus a reduced liquid level 28 inside the liquid conduit. The reduced liquid level 28 results in lower liquid flow through the liquid openings 26.

The distribution unit of the present invention thus has a certain compensational response to variations in liquid depth on the tray or to differences in elevation of different distribution units which a traditional chimney tray does not have. For a low distribution unit, the liquid level 28 will be lower relative to liquid level 27 than for a high distribution unit. This compensational effect tends to reduce the liquid maldistribution due to out-of-level conditions as defined in equation (1).

Other benefits of the present invention relative to prior art include:

Improved vapor liquid flow rangeability

A good local liquid spread/distribution from each downcomer 21.

Low liquid maldistribution caused by pressure variations in the vapor space above the tray as defined in equation (2).

A low risk of fouling and plugging of the liquid openings 26 due to the initial upward liquid flow direction which tends to separate or settle out scales and particles before these solids reach the liquid openings 26.

Unlike the prior art chimney trays, high vapor velocities may exist in the downcomer 21 and in the pipe 32 without negatively affecting the distribution performance. Consequently, the distribution tray of the present invention can be designed for a low total cross sectional area of the downcomers. The result is that only a smaller fraction of the tray area is occupied by distribution units. This has several benefits including:

1. The flow area available for horizontal liquid flow across the tray plate is large, and therefore the liquid level gradients due to this cross flow are small and will not negatively affect the distribution performance of the tray to any significant extent.
2. Due to the small total cross sectional area of the pipe piece 32 on the tray 20, no caps are needed above the distribution unit since it is only small amounts of liquid which will by-pass the liquid openings 26 through the upper ends of the downcomers.
3. The tray is easier to clean during periods when the reactor is shut down due to wide cleaning lanes between adjacent distribution units. Cleaning is typically done with high pressure water jetting.
4. The tray segments are easier to assemble and disassemble, since there is plenty of access room available between the distribution units for tools and personnel.

The performance of the distribution tray of the present invention has been compared to the performance of three other types of distribution trays:

1. A traditional chimney tray designed with low vapor velocity in the chimney.
2. A chimney tray with high vapor velocity in the chimney resulting in a larger degree of liquid dispersion and liquid spread at the outlet.
3. A traditional bubble cap tray.

The distribution performance has been evaluated in an application corresponding to a hydroprocessing reactor with an inner diameter of 4.5 m. The actual volumetric liquid flow to the distribution tray range from 53 $m^3/hr$ to 663 $m^3/hr$, corresponding to liquid mass fluxes in the reactor ranging from 2 $ton/m^2/hr$ to 25 $ton/m^2/hr$. The actual volumetric vapor flow to the tray varies from 5,370 $m^3/hr$ to 19,243 $m^3/hr$. The vapor and liquid properties used are given in table 1. The distributor performances have been evaluated in thirty combinations of liquid and vapor flow to cover the relevant operating flow range. These liquid and vapor flow combinations are given in table 2.

TABLE 1

| Vapor and liquid properties used for distributor comparison | |
|---|---|
| Vapor density, $kg/m^3$ | 25 |
| Vapor viscosity, cP | 0.02 |
| Liquid density, $kg/m^3$ | 600 |
| Liquid viscosity, cP | 0.15 |
| Liquid surface tension, dynes/cm | 8.0 |

TABLE 2

| | Vapor and liquid flow combinations used for distributor comparison | |
|---|---|---|
| Data set no. | Liquid volumetric flow Actual $m^3/hr$ | Vapor volumetric flow Actual $m^3/hr$ |
| 1 | 53 | 5,370 |
| 2 | 53 | 7,831 |
| 3 | 53 | 11,188 |
| 4 | 53 | 14,991 |
| 5 | 53 | 19,243 |
| 6 | 106 | 5,370 |
| 7 | 106 | 7,831 |
| 8 | 106 | 11,188 |
| 9 | 106 | 14,991 |
| 10 | 106 | 19,243 |
| 11 | 159 | 5,370 |
| 12 | 159 | 7,831 |
| 13 | 159 | 11,188 |
| 14 | 159 | 14,991 |
| 15 | 159 | 19,243 |
| 16 | 265 | 5,370 |
| 17 | 265 | 7,831 |
| 18 | 265 | 11,188 |
| 19 | 265 | 14,991 |
| 20 | 265 | 19,243 |
| 21 | 464 | 5,370 |
| 22 | 464 | 7,831 |
| 23 | 464 | 11,188 |
| 24 | 464 | 14,991 |
| 25 | 464 | 19,243 |

TABLE 2-continued

Vapor and liquid flow combinations used for distributor comparison

| Data set no. | Liquid volumetric flow Actual m³/hr | Vapor volumetric flow Actual m³/hr |
|---|---|---|
| 26 | 663 | 5,370 |
| 27 | 663 | 7,831 |
| 28 | 663 | 11,188 |
| 29 | 663 | 14,991 |
| 30 | 663 | 19,243 |

All four distribution trays have been designed to achieve optimal performance for the fluid flows and properties given above. Drawings of the evaluated chimneys and the bubble cap are given in FIGS. 4A, 4B and 4C. Drawings of the evaluated distributor of the present invention are given in FIGS. 2A, 2B, 2C and 3. The number of distribution units on the distribution trays and the pitch used are given in table 3. The performance of a distribution tray can always be improved by increasing the distributor height. The pressure shell of a catalytic rector is an expensive piece of equipment, and a higher distributor will take up more reactor space and will increase the size and cost of the reactor. To make a fair comparison, the total height of the distribution units above the tray plate for all four distribution trays is 240 mm.

TABLE 3

Number of distribution units and pitch

| | Distributor pitch | Distributor spacing, mm | Number of distribution units per m² | Number of distribution units on tray |
|---|---|---|---|---|
| Low velocity chimney tray | Triangular | 113 | 90 | 1350 |
| High velocity chimney tray | Triangular | 162 | 44 | 653 |
| Bubble cap tray | Triangular | 105 | 105 | 1564 |
| Present invention | Triangular | 136 | 62 | 937 |

Figure 4C:
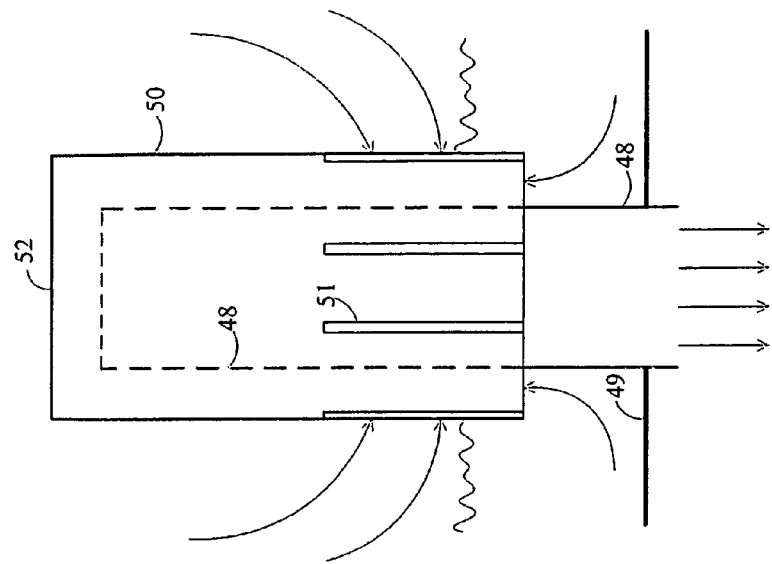
FIGS. 4A, 4B and 4C show the prior art distribution units that have been evaluated and compared with the distribution tray of the present invention.
Figure 4B:
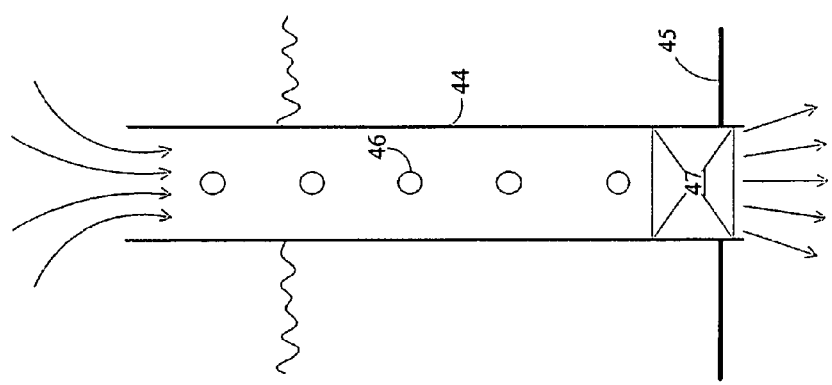
Figure 4A:
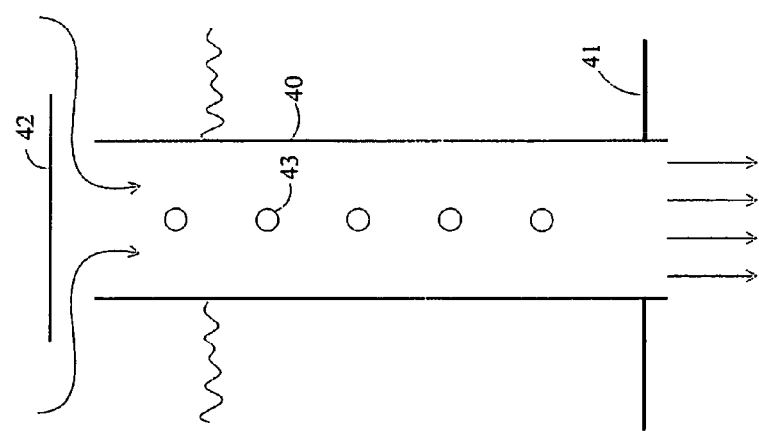

Now referring to FIGS. 4A, 4B and 4C, FIG. 4A is a side sectional view of one of the chimneys of the evaluated low velocity chimney distribution tray. Arrows in the figure indicate the fluid flow path. The chimney 40 consists of 2-inch nominal diameter pipe with an inner diameter of 54.8 mm and an outer diameter of 60.3 mm. The chimney is routed through tray plate 41. The chimney extends 226 mm above the tray plate. A circular cap 42 with a diameter of 85 mm is positioned above the chimney at an elevation of 240 mm above the tray plate. The chimney 40 is provided with five circular liquid openings 43 which are equally spaced in the vertical direction and which all have a diameter of 5.9 mm. The center of the lowest liquid hole is elevated 50 mm above the tray plate. The vertical spacing between adjacent liquid holes is 35 mm.

FIG. 4B is a side sectional view of one of the chimneys of the evaluated high velocity chimney distribution tray. Arrows in the figure indicate the fluid flow path. The chimney 44 consists of 1½ inch nominal diameter pipe with an inner diameter of 42.8 mm and an outer diameter of 48.3 mm. The chimney is routed through a tray plate 45. The chimney extends 240 mm above the tray plate. Due to the small total cross sectional area of the chimneys on the tray, no chimney cap is used. The chimney 44 is provided with five circular liquid openings 46 which are equally spaced in the vertical direction and which all have a diameter of 8.2 mm. The center of the lowest liquid hole is elevated 50 mm above the tray plate. The vertical spacing between adjacent liquid holes is 38 mm. Inserts 47 for liquid dispersion are located in the outlet of chimney 44 to achieve a better spread of the liquid exiting the chimney.

FIG. 4C is a side sectional view of one of the bubble cap units of the evaluated bubble cap distribution tray. Arrows in the figure indicate the fluid flow path. The bubble cap consists of a downcomer 48 which is routed through a tray plate 49. The downcomer 48 consists of 1½ inch nominal diameter pipe with an inner diameter of 42.8 mm and an outer diameter of 48.3 mm. The height of the downcomer extending above the tray plate is 225 mm. The cap 50 is concentrically overlaying the downcomer and is constructed of 2½ inch nominal diameter pipe with an inner diameter of 66.9 mm and an outer diameter of 73.0 mm. The upper end of the cap is closed by a circular plate 52. The lower edge of cap 50 is elevated 50 mm above the tray plate. The circular plate 52 is elevated 240 mm above the tray plate. The lateral wall of the cap is provided with six vertical and rectangular slots 51 which are equally distributed along the circumference of the cap. Each slot is 90 mm high and 3.5 mm wide.

The liquid level on the tray plate, the liquid maldistribution due to ½ inch out-of-level as defined in equation (1), the liquid maldistribution due to 50 Pa pressure difference as defined in equation (2), the maximum difference in liquid level on the tray caused by liquid flow across the tray, and the flow velocities inside the distribution units in each of the thirty vapor-liquid flow combinations are given in tables 4, 5, 6 and 7 for each of the four distribution trays.

TABLE 4

Performance of the low velocity chimney tray (FIG. 4A)

| Data set no. | Liquid level above tray plate mm | Liquid maldistribution due to ½" out-of-level % | Liquid maldistribution due to 50 Pa pressure difference % | Maximum liquid level difference due to cross flow Mm | Two-phase flow velocity inside chimney m/s |
|---|---|---|---|---|---|
| 1 | 64.8 | 40.6 | 11.9 | 0.5 | 0.47 |
| 2 | 63.4 | 40.2 | 7.6 | 0.6 | 0.69 |
| 3 | 60.5 | 39.7 | 5.4 | 0.6 | 0.98 |
| 4 | 56.1 | 98.9 | 18.6 | 0.7 | 1.31 |
| 5 | 52.2 | 200.0 | 153.8 | 0.8 | 1.68 |
| 6 | 87.3 | 53.4 | 33.8 | 1.2 | 0.48 |
| 7 | 86.6 | 53.6 | 35.2 | 1.2 | 0.69 |
| 8 | 85.5 | 54.2 | 36.6 | 1.2 | 0.99 |
| 9 | 84.5 | 55.3 | 39.9 | 1.3 | 1.32 |
| 10 | 83.6 | 56.6 | 43.8 | 1.3 | 1.69 |
| 11 | 104.6 | 18.7 | 6.6 | 1.8 | 0.48 |
| 12 | 103.2 | 18.5 | 4.8 | 1.9 | 0.70 |
| 13 | 100.3 | 18.3 | 4.0 | 2.0 | 0.99 |
| 14 | 95.9 | 18.1 | 3.5 | 2.2 | 1.32 |
| 15 | 89.4 | 52.0 | 21.2 | 2.5 | 1.69 |
| 16 | 133.3 | 16.3 | 6.2 | 2.9 | 0.49 |
| 17 | 131.9 | 16.2 | 4.9 | 3.2 | 0.71 |
| 18 | 129.1 | 16.0 | 4.2 | 3.4 | 1.00 |
| 19 | 124.6 | 29.0 | 11.2 | 3.7 | 1.33 |
| 20 | 121.5 | 32.6 | 24.2 | 3.8 | 1.70 |
| 21 | 183.5 | 10.9 | 3.8 | 5.2 | 0.51 |
| 22 | 182.2 | 9.9 | 3.2 | 5.2 | 0.72 |
| 23 | 179.3 | 8.7 | 2.9 | 5.4 | 1.02 |
| 24 | 174.9 | 8.6 | 2.5 | 5.7 | 1.35 |
| 25 | 168.5 | 8.5 | 2.3 | 6.1 | 1.72 |
| 26 | 225.9 | 6.8 | 3.1 | 6.9 | 0.53 |
| 27 | 224.6 | 6.7 | 2.7 | 7.0 | 0.74 |
| 28 | 221.5 | 6.7 | 2.4 | 7.2 | 1.03 |

TABLE 4-continued

Performance of the low velocity chimney tray (FIG. 4A)

| Data set no. | Liquid level above tray plate mm | Liquid maldistribution due to ½" out-of-level % | Liquid maldistribution due to 50 Pa pressure difference % | Maximum liquid level difference due to cross flow Mm | Two-phase flow velocity inside chimney m/s |
|---|---|---|---|---|---|
| 29 | 217.1 | 6.6 | 2.2 | 7.5 | 1.37 |
| 30 | 210.7 | 6.5 | 2.0 | 8.0 | 1.74 |
| Average: | | 33.6 | 16.8 | | |

TABLE 5

Performance of the high velocity chimney tray (FIG. 4B)

| Data set no. | Liquid level above tray plate mm | Liquid maldistribution due to ½" out-of-level % | Liquid maldistribution due to 50 Pa pressure difference % | Maximum liquid level difference due to cross flow, Mm | Two-phase flow velocity inside chimney m/s |
|---|---|---|---|---|---|
| 1 | 59.1 | 40.6 | 14.6 | 0.1 | 1.6 |
| 2 | 52.9 | 190.0 | 99.8 | 0.1 | 2.3 |
| 3 | 51.1 | 200.0 | 166.6 | 0.1 | 3.3 |
| 4 | 50.0 | 200.0 | 200 | 0.1 | 4.4 |
| 5 | 49.2 | 200.0 | 200 | 0.1 | 5.7 |
| 6 | 88.1 | 51.6 | 43.4 | 0.1 | 1.6 |
| 7 | 86.1 | 52.6 | 41.1 | 0.2 | 2.3 |
| 8 | 83.3 | 44.5 | 28.3 | 0.2 | 3.3 |
| 9 | 53.5 | 153.8 | 78.4 | 0.4 | 4.5 |
| 10 | 52.0 | 200.0 | 126 | 0.4 | 5.7 |
| 11 | 103.7 | 14.8 | 7.8 | 0.2 | 1.6 |
| 12 | 92.9 | 39.5 | 21.3 | 0.3 | 2.4 |
| 13 | 88.8 | 54.8 | 49.2 | 0.3 | 3.4 |
| 14 | 86.4 | 55.1 | 47.6 | 0.3 | 4.5 |
| 15 | 84.6 | 52.2 | 38.4 | 0.4 | 5.7 |
| 16 | 135.3 | 14.1 | 7.0 | 0.4 | 1.7 |
| 17 | 128.3 | 30.3 | 20.7 | 0.4 | 2.4 |
| 18 | 124.6 | 30.6 | 25.3 | 0.5 | 3.4 |
| 19 | 112.4 | 4.7 | 2.4 | 0.5 | 4.5 |
| 20 | 90.1 | 55.8 | 40.1 | 0.9 | 5.8 |
| 21 | 192.1 | 7.3 | 4.2 | 0.6 | 1.7 |
| 22 | 181.5 | 6.8 | 3.9 | 0.6 | 2.5 |
| 23 | 166.2 | 21.3 | 15.1 | 0.8 | 3.4 |
| 24 | 161.6 | 21.4 | 15.8 | 0.9 | 4.6 |
| 25 | 129.4 | 28.5 | 17.9 | 1.2 | 5.8 |
| 26 | 240.0 | 5.5 | 3.3 | 0.7 | 1.8 |
| 27 | 228.9 | 5.3 | 3.1 | 0.8 | 2.5 |
| 28 | 208.1 | 10.7 | 5.4 | 1.0 | 3.5 |
| 29 | 200.6 | 16.2 | 13.4 | 1.2 | 4.6 |
| 30 | 169.5 | 13.9 | 7.2 | 1.4 | 5.9 |
| Average: | | 60.7 | 44.9 | | |

TABLE 6

Performance of the bubble cap tray (FIG. 4C)

| Data set no. | Liquid level above tray plate mm | Liquid maldistribution due to ½" out-of-level % | Liquid maldistribution due to 50 Pa pressure difference % | Maximum liquid level difference due to cross flow mm | Two-phase flow velocity in upflow channel m/s | Two-phase flow velocity in downflow channel m/s |
|---|---|---|---|---|---|---|
| 1 | 105.1 | 22.6 | 118.8 | 0.3 | 0.6 | 0.7 |
| 2 | 93.7 | 66.3 | 83.3 | 0.3 | 0.8 | 1.0 |
| 3 | 79.5 | 81.0 | 46.6 | 0.4 | 1.2 | 1.4 |

TABLE 6-continued

Performance of the bubble cap tray (FIG. 4C)

| Data set no. | Liquid level above tray plate mm | Liquid maldistribution due to ½" out-of-level % | Liquid maldistribution due to 50 Pa pressure difference % | Maximum liquid level difference due to cross flow mm | Two-phase flow velocity in upflow channel m/s | Two-phase flow velocity in downflow channel m/s |
|---|---|---|---|---|---|---|
| 4 | 64.9 | 81.5 | 20.4 | 0.4 | 1.6 | 1.9 |
| 5 | 50.0 | 82.8 | 3.3 | 0.6 | 2.0 | 2.4 |
| 6 | 105.7 | 18.3 | 96.6 | 1.1 | 0.6 | 0.7 |
| 7 | 94.6 | 59.5 | 63.2 | 1.2 | 0.8 | 1.0 |
| 8 | 80.8 | 78.8 | 31.6 | 1.3 | 1.2 | 1.4 |
| 9 | 66.6 | 83.1 | 9.4 | 1.6 | 1.6 | 1.9 |
| 10 | 52.2 | 81.8 | 5.7 | 2.2 | 2.0 | 2.4 |
| 11 | 106.1 | 16.4 | 82.4 | 2.4 | 0.6 | 0.7 |
| 12 | 95.2 | 53.2 | 50.9 | 2.7 | 0.8 | 1.0 |
| 13 | 81.8 | 71.9 | 22.9 | 3.2 | 1.2 | 1.4 |
| 14 | 67.9 | 77.4 | 3.8 | 3.9 | 1.6 | 1.9 |
| 15 | 53.8 | 77.4 | 9.2 | 4.7 | 2.0 | 2.4 |
| 16 | 106.8 | 14.4 | 60.5 | 6.7 | 0.6 | 0.7 |
| 17 | 96.2 | 42.6 | 33.1 | 7.7 | 0.9 | 1.0 |
| 18 | 83.2 | 56.2 | 11 | 9.0 | 1.2 | 1.4 |
| 19 | 69.8 | 59.7 | 1.7 | 10.7 | 1.6 | 1.9 |
| 20 | 56.1 | 59.1 | 9.2 | 13.7 | 2.1 | 2.4 |
| 21 | 107.1 | 17.1 | 37.6 | 21.5 | 0.6 | 0.7 |
| 22 | 97.6 | 36.6 | 16 | 24.4 | 0.9 | 1.0 |
| 23 | 85.2 | 45.1 | 0.4 | 28.8 | 1.2 | 1.4 |
| 24 | 72.4 | 46.3 | 8.1 | 37.6 | 1.6 | 1.9 |
| 25 | 59.4 | 44.9 | 12.8 | >50 | 2.1 | 2.4 |
| 26 | 108.6 | 20.4 | 27.2 | 47.2 | 0.6 | 0.7 |
| 27 | 98.8 | 36.6 | 8.4 | >50 | 0.9 | 1.0 |
| 28 | 86.8 | 43.5 | 4.7 | >50 | 1.3 | 1.5 |
| 29 | 74.5 | 44.1 | 11.3 | >50 | 1.7 | 1.9 |
| 30 | 62.0 | 42.4 | 14.7 | >50 | 2.1 | 2.5 |
| Average: | | 52.0 | 30.2 | | | |

TABLE 7

Performance of the present invention (FIGS. 2A-C and 3)

| Data set no. | Liquid maldistribution due to ½" out-of-level % | Liquid maldistribution due to 50 Pa pressure difference % | Maximum liquid level difference due to cross flow mm |
|---|---|---|---|
| 1 | 29.6 | 16.9 | 0.1 |
| 2 | 28.4 | 16.1 | 0.1 |
| 3 | 26.7 | 15.0 | 0.1 |
| 4 | 24.8 | 13.8 | 0.1 |
| 5 | 22.7 | 12.5 | 0.2 |
| 6 | 33.9 | 19.6 | 0.2 |
| 7 | 32.0 | 18.3 | 0.2 |
| 8 | 29.3 | 16.7 | 0.3 |
| 9 | 26.4 | 15.0 | 0.3 |
| 10 | 23.4 | 13.2 | 0.5 |
| 11 | 13.2 | 8.1 | 0.4 |
| 12 | 12.9 | 7.8 | 0.4 |
| 13 | 12.4 | 7.4 | 0.4 |
| 14 | 11.8 | 6.9 | 0.5 |
| 15 | 11.1 | 6.5 | 0.7 |
| 16 | 17.9 | 10.8 | 0.6 |
| 17 | 17.1 | 10.2 | 0.7 |
| 18 | 16.0 | 9.5 | 0.7 |
| 19 | 14.7 | 8.7 | 0.9 |
| 20 | 13.4 | 7.8 | 1.1 |
| 21 | 14.7 | 8.5 | 1.8 |
| 22 | 14.0 | 8.1 | 1.4 |
| 23 | 13.0 | 7.5 | 1.7 |
| 24 | 11.8 | 6.9 | 1.7 |
| 25 | 10.6 | 6.3 | 2.7 |

TABLE 7-continued

Performance of the present invention (FIGS. 2A-C and 3)

| Data set no. | Liquid maldistribution due to ½" out-of-level % | Liquid maldistribution due to 50 Pa pressure difference % | Maximum liquid level difference due to cross flow mm |
|---|---|---|---|
| 26 | 12.0 | 7.6 | 2.9 |
| 27 | 11.5 | 7.3 | 2.3 |
| 28 | 10.8 | 6.8 | 2.7 |
| 29 | 10.0 | 6.2 | 3.5 |
| 30 | 9.1 | 5.6 | 3.3 |
| Average: | 17.9 | 10.4 | |

Now the performance of the four distributors is discussed based on the six criteria for proper performance of a distribution tray given above.

Criterion A:

As seen from table 4, the liquid level on the low velocity chimney tray is mainly a function of liquid flow. At high liquid flow the level is high. At low liquid flow the level is low. As a consequence of the low liquid level at low liquid flow rates, the maldistribution due to ½" out-of-level is high (see data set no. 1 through 10 and data set no. 15). In data set no. 5 the maldistribution due to ½" out-of-level is as high as 200%, indicating complete maldistribution with no liquid flow through the higher elevated chimney. The low velocity chimney tray thus does not have the required liquid flow rangeability. The average maldistribution due to ½" out-of-level for all 30 data sets is 33.6%.

When comparing tables 4 and 5, it can be seen that the liquid level on the high velocity chimney tray is lower than the liquid level on the low velocity chimney tray for the data sets with low liquid flow and high vapor flow, even though the maximum liquid level (data set no. 26) is higher for the high velocity chimney tray. The liquid flow rangeability of a chimney tray is reduced with increased flow velocity in the chimney. For the high velocity chimney tray the pressure drop for vapor entering the chimney is high and is significantly increased when the vapor flow to the tray is increased. Therefore, the pressure drop across the lateral liquid openings is also increased when the vapor flow is increased and the liquid openings will start to pass more liquid. The liquid level on the tray will therefore drop until the liquid flow through the liquid openings equals the liquid flow fed to the tray. The low liquid level combined with the high pressure drop across the liquid openings results in higher maldistribution due to ½" out-of-level of the high velocity chimney than the low velocity chimney in the data sets with low liquid flow and high vapor flow. The average maldistribution due to ½" out-of-level for all 30 data sets is 60.7% which is almost twice as high as for the low velocity chimney.

As seen from table 6, the liquid level on the bubble cap tray is mainly a function of vapor flow rate and not as much of liquid flow rate. At high vapor rates the liquid level is low, and at low vapor flow rates the liquid level is high. The average maldistribution due to ½" out-of-level for all 30 data sets is 52.0% which is almost as high as for the high velocity chimney.

As seen from table 7, the distribution tray of the present invention has fully acceptable maldistribution due to ½" out-of-level throughout the entire range of vapor and liquid flows. The maldistribution is generally slightly higher at low liquid flows and low vapor flows. The average maldistribution due to ½" out-of-level for all 30 data sets is 17.9% which is significantly lower than for the three other distributor types. The average percent maldistributions of the four distributor types are compared in Plot 1 shown in FIG. 13.

Criterion B:

As seen from table 3, the distribution trays with relatively low dispersion or spread of the liquid exiting each distribution unit (i.e. the low velocity chimney tray and the bubble cap tray) has a distributor density of 90 units/m$^2$ or larger, and uniform distribution at the inlet of the active catalyst bed should therefore be achieved. For the distribution trays designed for liquid dispersion and a certain liquid spread at the outlet from each distribution unit (i.e. the high velocity chimney tray and the distribution tray of the present invention) the distribution unit density is lower than 90 units/m$^2$, but the inserts used for liquid dispersion in the outlet of the distribution units are designed so that a uniform liquid distribution at the inlet of the active catalyst is achieved.

Criterion C:

All four distributors are designed to allow for accumulation of a layer of scales and particles on the tray plate up to a layer depth of 50 mm before distribution performance is affected due to fouling and plugging of apertures and flow channels. All four distribution trays therefore have an acceptable resistance to fouling and plugging. The bubble cap and the distribution unit of the present invention have better resistance to fouling than the two chimney trays. For the bubble cap, it is the high vapor flow velocity through the slots that tends to keep the slots clean and free of fouling. For the distribution tray of the present invention, it is the initial upward flow direction of all liquid in the liquid conduit that causes scales and particles to settle out on the tray before these solids reach the liquid openings.

Criterion D:

The chimneys of the low velocity chimney tray occupy 24.2% of the reactor cross sectional area. The chimney caps occupy 48.2% of the reactor cross sectional area. Therefore a significant amount of the liquid falling down on the distribution tray from above will hit the caps. This liquid will flow to the cap edges and will have to fall through the horizontal flow of vapor entering the chimney. A significant amount of the liquid may be entrained by the vapor. This liquid will thus by-pass the lateral liquid openings and result in liquid maldistribution.

The chimneys of the high velocity chimney tray occupy only 5.9% of the reactor cross sectional area. Chimney caps are not needed since only a smaller amount of the liquid falling down on the distribution tray from above will hit the open upper ends of the chimneys and by-pass the lateral liquid openings through the chimneys.

For the bubble caps, some entrained liquid will enter the upper part of the slots together with the vapor. However when entrained liquid is entering the slots with the vapor, less liquid is lifted up from the liquid pool. The bubble cap design therefore tends to compensate for entrained liquid.

The distribution tray of the present invention has a small downcomer area. Therefore, as for the high velocity chimney tray, it is only small amounts of the liquid falling down on the distribution tray from above that will hit the open upper end of the downcomer and by-pass the liquid conduits through the downcomer.

Criterion E:

As seen from tables 4, 5, 6 and 7, the level difference caused by liquid flow across the tray is increased with increased liquid flow rate to the tray.

The high velocity chimney tray and the distribution tray of the present invention have relatively low level differences of maximum 1.4 mm and 3.3 mm respectively.

The low velocity chimney tray has high level differences of up to 8.0 mm due to the larger chimney cross sectional area.

The bubble cap tray has unacceptable large level differences exceeding 50 mm due to the large fraction of the tray area occupied by caps and due to the lower liquid level. When comparing the large level differences with the large maldistribution due to ½ inch out-of-level, it can be concluded that severe liquid maldistribution will result from the bubble cap tray at high liquid flow rates.

Figure 13:
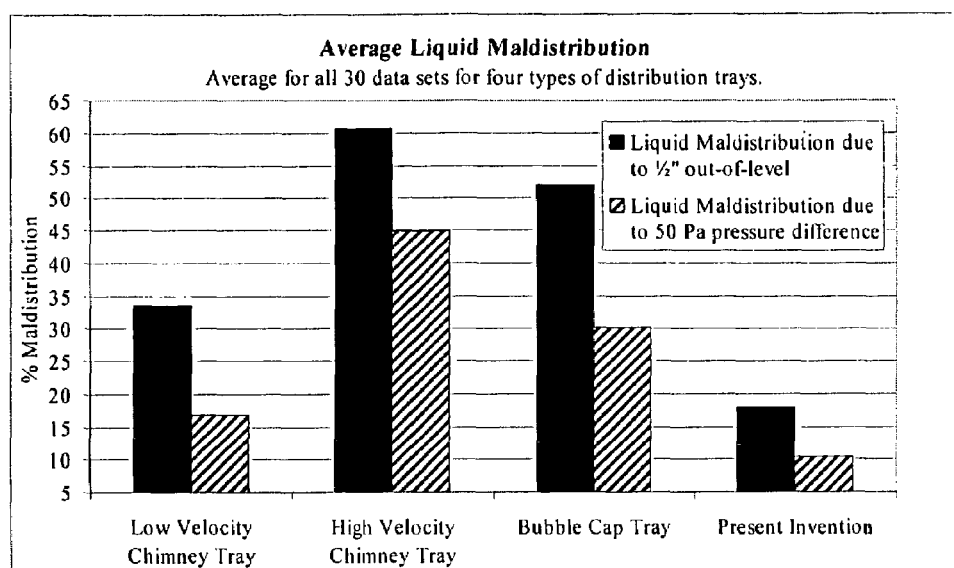
FIG. 13 is a graphical representation of the average liquid maldistribution for four different types of distribution trays.

Criterion F:

The liquid maldistributions caused by a 50 Pa pressure difference in the vapor space above the distribution tray for each of the four distributors are given in table 4, 5, 6 and 7 and compared in plot 1 of FIG. 13. As seen, the high velocity chimney tray and the bubble cap tray are sensitive to pressure variations with average liquid maldistribution due to 50 Pa pressure difference of 44.9% and 30.2% respectively. The low velocity chimney tray is less affected by pressure variations and has an average maldistribution due to 50 Pa pressure difference of 16.8%, while the distribution tray of the present invention has the lowest sensitivity to pressure variations with an average maldistribution due to 50 Pa pressure difference of only 10.4%.

A summary of the above comparison of the four distribution tray types based on the six criteria is given in table 8. As seen from table 8, the distribution tray of the present invention is the optimal distribution tray.

TABLE 8

Summary of the comparison of four distribution tray types.

| | Low velocity chimney tray | High velocity chimney tray | Bubble cap tray | Present invention |
|---|---|---|---|---|
| Criterion A: | Poor | Very Poor | Very Poor | Good |
| Criterion B: | Good | Good | Good | Good |
| Criterion C: | Acceptable | Acceptable | Good | Good |
| Criterion D: | Poor | Acceptable | Good | Acceptable |
| Criterion E: | Poor | Good | Very Poor | Good |
| Criterion F: | Acceptable | Poor | Poor | Good |

Now some alternative embodiments of the present invention will be presented. More than one liquid conduit may be used per distribution unit. The required flow resistance towards liquid flow from the liquid pool through the liquid conduits and into the downcomer is typically obtained mainly by the liquid openings. However openings or restrictions at the entrance to the liquid conduit or inside the liquid conduit may also be used to achieve the required flow resistance. The liquid openings may have any shape, such as, for instance, circular, rectangular or a tapered notch. The cross sectional area of the liquid conduit may have any shape, such as, for instance, circular, ellipsoidal, triangular, rectangular, polygonal, annular, or any shape composed of two or more of such shapes. The cross sectional area of the downcomer may have any shape, such as, for instance, circular, ellipsoidal, triangular, rectangular, polygonal or any shape composed of two or more of such shapes. The cross sectional area of the reduced area section may have any shape, such as, for instance, circular, ellipsoidal, triangular, rectangular, polygonal, annular or any shape composed of two or more of such shapes. Neither the means for achieving improved liquid spread in the downcomer outlet nor the reduced flow area section necessarily must be used. Impingement plates may be used below the downcomer outlet to break down the velocity of the jet to prevent the jet from being capable of moving the inert or catalyst particles below, and to improve the liquid spread. The impingement plate may be flat or curved or have any other shape. The impingement plate may be solid or have perforations or apertures.

An example of an alternative embodiment of a distribution unit of the present invention is given in FIGS. 5A, 5B and 5C. FIG. 5A is a sectional view from above of the distribution unit taken along segment A-A of FIGS. 5B and 5C. FIG. 5B is a side sectional view of the distribution unit taken along the segment B-B of FIG. 5A. Arrows in FIG. 5B indicate the fluid flow path through the distribution unit. FIG. 5C is a side sectional view of the distribution unit taken along the segment C-C of FIG. 5A.

The distribution tray consists of a tray plate 60 provided with a plurality of distribution units 75. Each distribution unit consists of a rectangular downcomer 61 fitted down through holes in the tray plate 60. A reduced flow area section is provided inside the downcomer, consisting of a rectangular channel 68 and a baffle 69. Two liquid conduits allow for liquid flow from a liquid pool 71 and into the downcomer 61. A first liquid conduit 77 has a rectangular cross section and is made of side walls 62 and top and bottom walls 63 and 67. The required flow resistance towards liquid flow from the liquid pool through the first liquid conduit 77 and into the downcomer 61 is obtained by two restrictions in series: One rectangular inlet opening 66 and a liquid opening consisting of a vertical slot 64. A second liquid conduit 76 is formed by the inner wall of the rectangular downcomer 61 and the outer wall of the rectangular channel 68. The required flow resistance towards liquid flow from the liquid pool through the second liquid conduit and into the downcomer is obtained by a circular inlet opening 65. Means for improved liquid spread 70 are used in the downcomer outlet. These means may consist of vanes, baffles, ribbons, packing, corrugated, flat or curved plates with or without perforations.

All joints between the side walls 62 and the downcomer 61, between the top wall 63 and the side walls 62, between the top wall 63 and the downcomer 61, between the bottom wall 67 and the side walls 62, between the bottom wall 67 and the downcomer 61, between the downcomer 61 and the tray plate 60, between the baffle 69 and the downcomer 61 and between the baffle 69 and the channel 68, are essentially leak-tight.

During operation, vapor 72 flows through the open upper end of downcomer 61. A pressure drop from the outside to the inside of the downcomer 61 is therefore generated. This pressure drop is utilized to lift the liquid from the pool 71 up into the first and the second liquid conduits 77 and 76. The liquid in the first liquid conduit 77 first flows through the inlet opening 66 which represents a flow restriction, then the liquid flows upward and through the liquid opening consisting of the vertical slot 64 before the liquid is mixed with the downward-flowing vapor inside the downcomer 61. The liquid in the second liquid conduit 76 is first flowing through inlet opening 65, which represents a flow restriction, then the liquid flows upward between the channel 68 and the downcomer 61, and finally the liquid overflows the upper edge of the channel 68 and into the channel 68, where it is mixed with the downward-flowing two-phase mixture. The increased flow velocity in the restricted flow area section, which the channel 68 represents, results in partial or complete liquid dispersion. The dispersed two-phase jet exiting the channel 68 then passes through the means for improved liquid spread 70, which provides a certain spread of the liquid exiting the distribution unit 75.

The distribution unit in FIGS. 5A-C has the benefit over the distribution unit 31 in FIG. 2 that the liquid opening 65 in FIG. 5C can easily be cleaned from the outside of distribution unit 75, while the lower liquid openings 26 in FIG. 2C have to be cleaned through the narrow downcomer which is somewhat more difficult. This is only if fixed attachments, such as welding, are used to fasten the liquid conduit to the downcomer. If the liquid conduit can be disassembled or removed from the downcomer, then easier access for cleaning of liquid openings 26 in FIG. 2C is provided.

In the previous examples of the present invention, the flow direction in the liquid conduit has in general been upward. However, the distribution unit according to the present invention may be designed with other general flow directions in the liquid conduit, such as downward flow. An example of an embodiment of a distribution unit of the present invention with a U shaped liquid conduit with a first downward flow section followed by a second upward flow section is given in FIGS. 6A, 6B and 6C.

FIG. 6A is a sectional view from above of the distribution unit taken along segment A-A of FIGS. 6B and 6C. FIG. 6B is a side sectional view of the distribution unit taken along the segment B-B of FIG. 6A. Arrows in FIG. 6B indicate the fluid flow path through the distribution unit. FIG. 6C is a side sectional view of the distribution unit taken along the segment C-C of FIG. 6A.

The distribution tray consists of a tray plate 80 provided with a plurality of distribution units 91. Each distribution unit consist of a circular downcomer 81 attached to the tray plate 80. A reduced flow area section is provided inside the downcomer consisting of a circular pipe 83 which is routed through the tray plate 80. The circular pipe extends down below the tray plate 80 to provide a liquid drip edge 86. The first downward flow section of a liquid conduit 88 is constructed of side walls 82 which are attached to the downcomer 81 and to the tray plate 80. All joints between the downcomer 81 and the tray plate 80, between the circular pipe 83 and the tray plate 80, between the side walls 82 and the tray plate 80, and between the side walls 82 and the downcomer 81 are essentially leak-tight. Four circular liquid openings 84 at different elevations are provided in the side wall 82. A rectangular opening 85 is provided in the downcomer 81 near the tray plate 80 to allow for liquid flow from the first downward flow section to the second upward flow section of the liquid conduit.

Caps may optionally be used to prevent direct liquid flow into the open upper ends of the downcomer 81 and the liquid conduits 88. However, due to the relatively small cross sectional area of these upper ends, such caps have been omitted in the illustrated examples.

During operation, vapor 90 flows through the open upper end of the downcomer 81. A pressure drop from the outside to the inside of the downcomer 81 is therefore generated. This pressure drop is utilized for liquid flow from the first downward flow section of the liquid conduit 88 through the opening 85 to the second upward flow section of the liquid conduit 88. The size of the opening 85 is usually selected so that a first liquid level 93 in the first and downward section of the liquid conduit 88 is lower than a second liquid level 92 in the second and upward flow section of the liquid conduit 88 in the operating cases with low liquid flow and high vapor flow, and so that the first liquid level 93 is higher than the second liquid level 92 in the operating cases with high liquid flow and low vapor flow. The difference in a liquid level 87 on the tray and the first liquid level 93 is the driving force for liquid to flow through the liquid openings 84 which are elevated below the tray liquid level 87. Liquid from a liquid pool 89 flows through the liquid openings 84 into the liquid conduit 88, where it first flows downward and through the opening 85 and then upward in the annular flow area defined by the downcomer 81 and the circular pipe 83. The liquid overflows the upper edge of the pipe 83, where it is mixed with the vapor flowing downward in the downcomer 81. The two-phase mixture flows through the pipe 83 and exits the pipe 83 below the tray plate 80.

Since there is very low or no pressure drop from outside the distribution unit 91 to the vapor space inside the upper part of the liquid conduit 88, the distributor in FIGS. 6A-C will show reduced maldistribution relative to traditional chimney trays due to the "Reason 1" mentioned above. However since some of the liquid openings 84 may pass the liquid into the vapor space above the surface of the first liquid level 93, the "Reason 2" for reduced maldistribution will be less pronounced for the distribution unit 91 than for the previous examples of the present invention. This is because the liquid flow through any such liquid opening 84 located above the first level 93 is not affected by the pressure drop for the vapor entering the upper open end of the downcomer 81.

Other drawbacks of the distribution unit 91 relative to the previous examples of the present invention are:
1. If no caps are used above the distribution unit, as shown in FIGS. 6A-C, the upper part of the liquid conduit 88 will collect some of the liquid which falls down from above. As a consequence, more liquid will by-pass the liquid openings 84. The by-passing liquid will not be distributed evenly across the tray.
2. Scales and particles may tend to collect in the bottom of the U-shaped liquid conduits upstream from the opening 85. These solids may tend to plug the opening 85. Plugging of this opening will result in liquid overflowing the downcomers 81. The overflowing liquid will be poorly distributed across the tray.

The previous examples of the present invention all have a liquid seal that prevents vapor flow through the liquid conduits. The liquid seal is achieved by having upward flow in at least a section of the liquid conduit. The present invention may also be designed without this liquid seal. In this case the majority of the vapor still flows through the open upper end of the downcomer, but a smaller amount of vapor may flow through the liquid conduits in the operating cases with high vapor flow rate and/or with low liquid flow. An example of such a distributor is given in FIGS. 7A-D.

FIG. 7A is a sectional view from above of the distribution unit taken along segment A-A of FIGS. 7C and 7D. FIG. 7B is a sectional view from above of the distribution unit taken along segment B-B of FIGS. 7C and 7D. FIG. 7C is a side sectional view of the distribution unit taken along the segment C-C of FIGS. 7A and 7B. FIG. 7D is a side sectional view of the distribution unit taken along the segment D-D of FIGS. 7A and 7B. Arrows in FIGS. 7C and 7D indicate the fluid flow path through the distribution unit.

The distribution tray consists of a tray plate 100 provided with a plurality of distribution units 111. Each distribution unit consists of a downcomer 101 with a cross section composed of rectangular and semicircular shapes. The downcomer 101 is fitted through a hole in the tray plate 100. The liquid conduit 112 is constructed of semicircular wall 102 which is attached to the downcomer 101 and to the tray plate 100. All joints between the downcomer 101 and the tray plate 100, between the semicircular wall 102 and the tray plate 100, and between the semicircular 102 and the downcomer 101 are essentially leak-tight. A plate 103 serves as cap to prevent direct liquid flow into the upper end of the liquid conduit 112 and the downcomer 101. Two rectangular vapor openings 107 are provided in the upper part of the downcomer 101 to allow for vapor entrance into the downcomer. Two circular holes 114 are provided in the upper part of the semicircular wall 102 to allow for vapor entrance into the liquid conduit 112. A circular hole 105 and a tapered slot 106 are provided as liquid openings in semicircular wall 102. Three circular openings 113 serve as flow restrictions and are provided in the downcomer 101 near the tray plate 100 to allow for vapor/liquid flow from the liquid conduit 112 into the downcomer 101. Below the lower open end of downcomer 101, an impingement plate 104 is located to break down the velocity of the two-phase jet exiting the downcomer 101 in order to prevent the high velocity jet from reaching the particles located below, and in order to provide a certain liquid spread.

During operation, the majority of vapor 109 flows through the two rectangular openings 107. A pressure drop from the outside to the inside of the downcomer 101 is therefore generated. Liquid 108 flows through the fraction of the liquid openings 105 and 106 which are below a liquid level 110. Vapor flows through circular holes 114 and through the fraction of the openings 105 and 106 which are above the liquid level 110. The vapor and liquid flow downward inside liquid conduit 112 and through the flow restrictions 113 into the downcomer 101, where this two-phase stream is mixed with the vapor flowing in the downcomer. The amount of vapor taking the path through the liquid conduit 112 adjusts itself until the total pressure drop through the openings 114, 105 and 106; through liquid conduit 112; and through openings 113 equals the pressure drop for vapor flow through the openings 107 and through the downcomer 101 to the mix point with the two-phase stream from the flow restrictions 113. The purpose of the flow restrictions or openings 113 is to reduce the vapor flow through the liquid conduit 112 and thus achieve a significantly lower flow velocity of the vapor entering the liquid conduit 112 than the vapor entering the downcomer 101. A low vapor entrance velocity to the liquid conduit 112 results in a low pressure drop from outside the distribution unit 111 to the inside of the liquid conduit, 112 and thus a low maldistribution as defined in equation (1).

Due to the vapor flow through the openings 114, 106, and 105, there is, however, a minor pressure drop from outside the distribution unit 111 to the inside of the liquid conduit 112. The distributor in FIGS. 7A-D will therefore show slightly increased maldistribution relative to the previous examples of the present invention, since the benefit of "Reason 1" mentioned above is reduced. Since the liquid openings 105 and 106 will pass the liquid into a vapor space inside the liquid conduit 112, the "Reason 2" for reduced maldistribution mentioned above is not relevant for the distribution unit 111.

In spite of these two drawbacks of the distribution unit 111 relative to the previous examples of the present invention, the distribution unit 111 will still show improved performance relative to traditional chimney distribution trays, because the distribution unit 111 can be designed with a small cross sectional area and with high vapor flow velocities in the downcomer 101 without significantly increasing the maldistribution as defined in equation (1). The significant benefits of small distribution units have already been discussed.

In some operating cases with high liquid flow and low vapor flow, a liquid level may build up in the conduit 112 just as for the distribution unit in FIGS. 6A-C. In that case, no vapor flows through the conduit 112 or the openings 113.

Figure 8A:
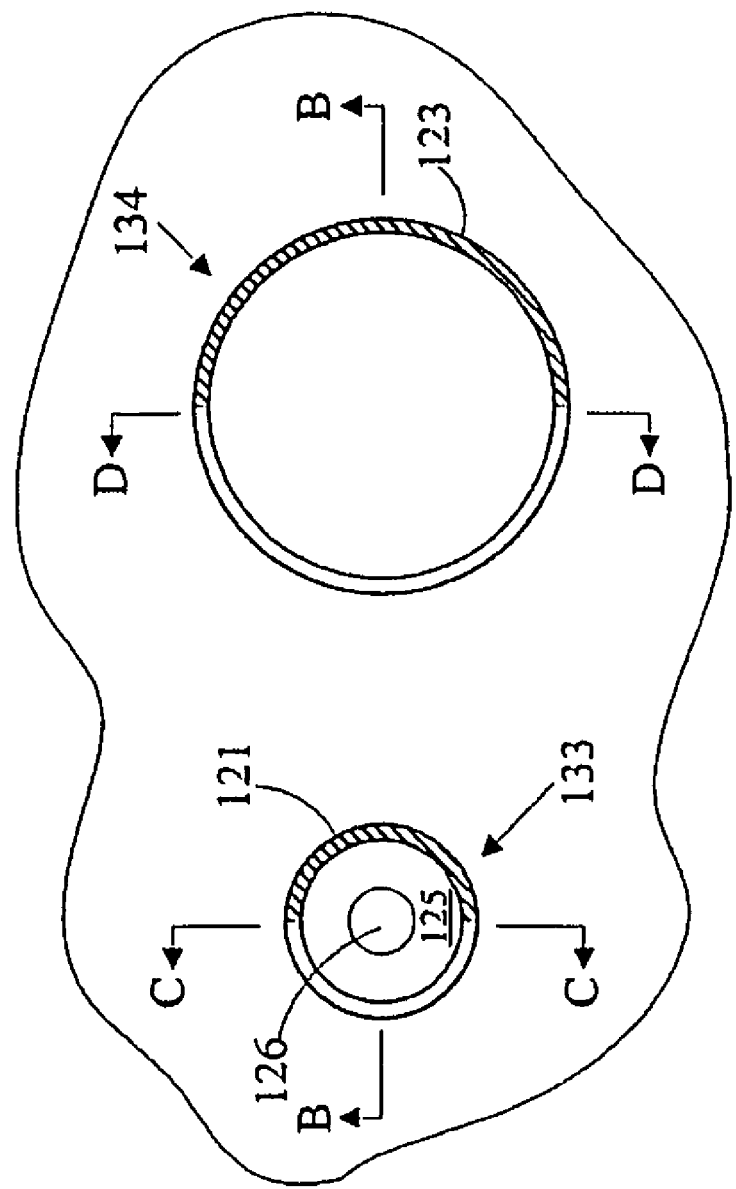
Figure 9:
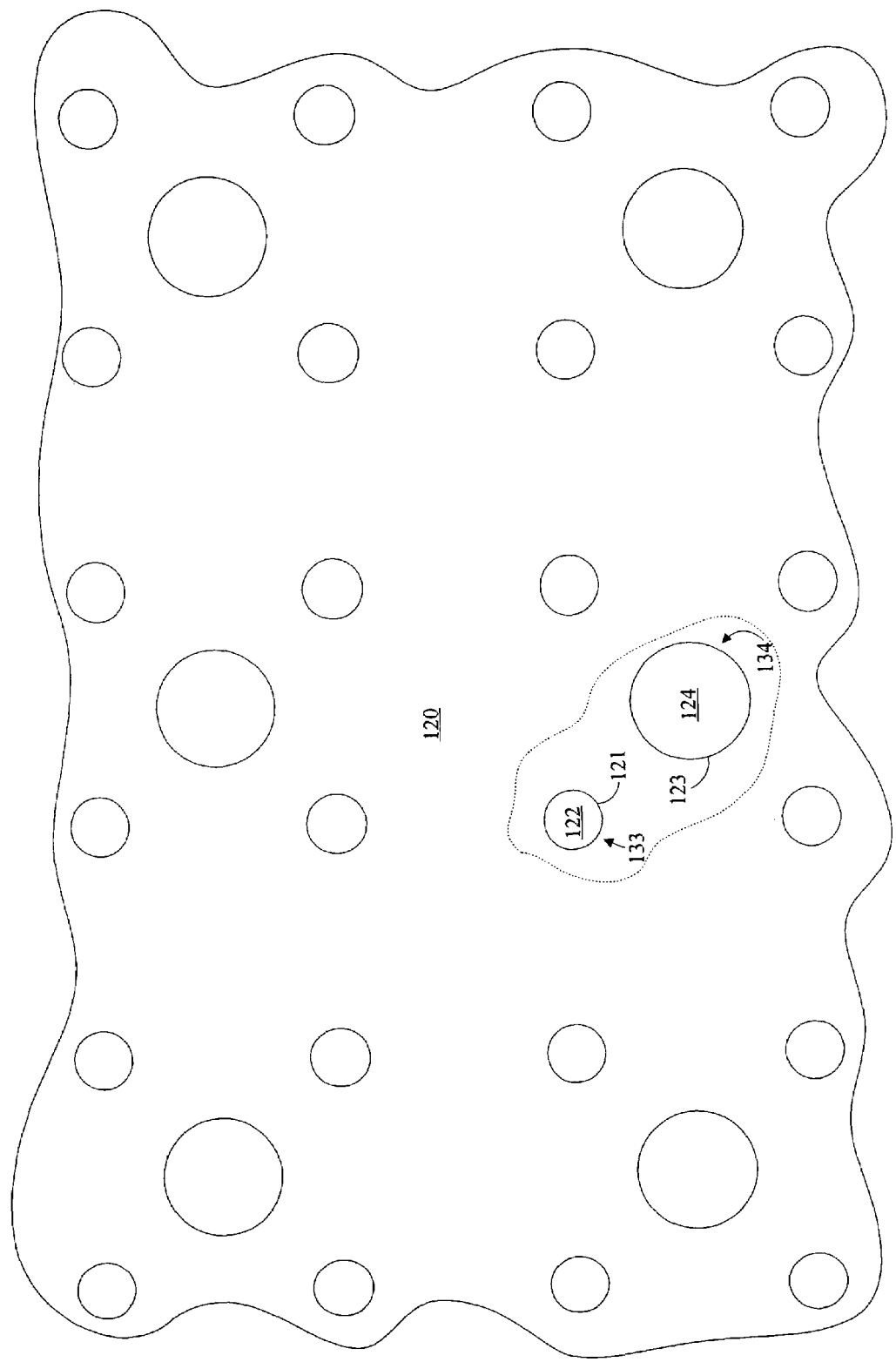
Figure 10:
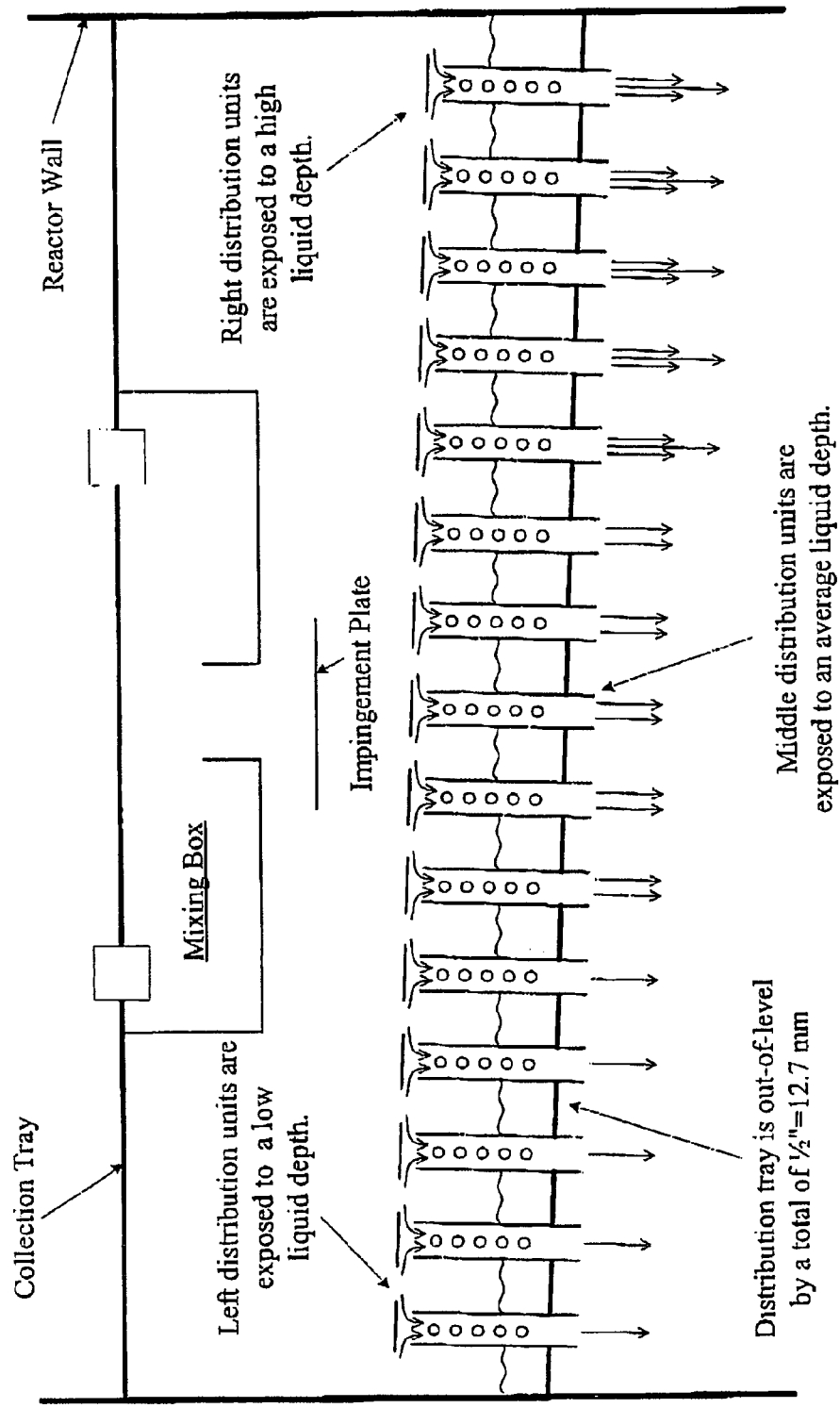
FIG. 10 is a diagrammatic illustration of the distribution of liquid levels in a reactor due to a non-level distribution plate.
Figure 11:
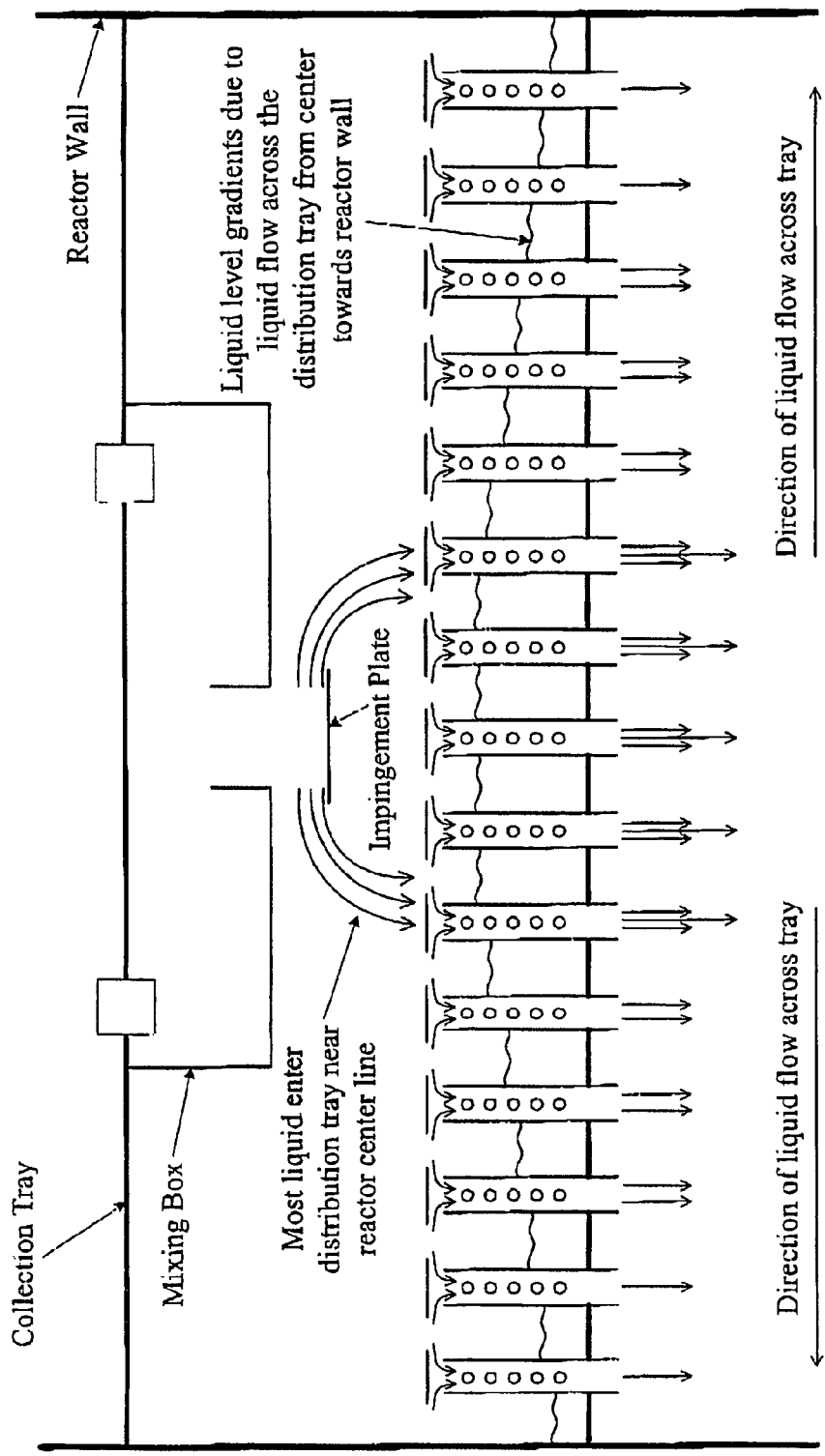
FIG. 11 is a diagrammatic illustration of the distribution liquid levels in a reactor caused by liquid flow across the distribution plate.
Figure 12:
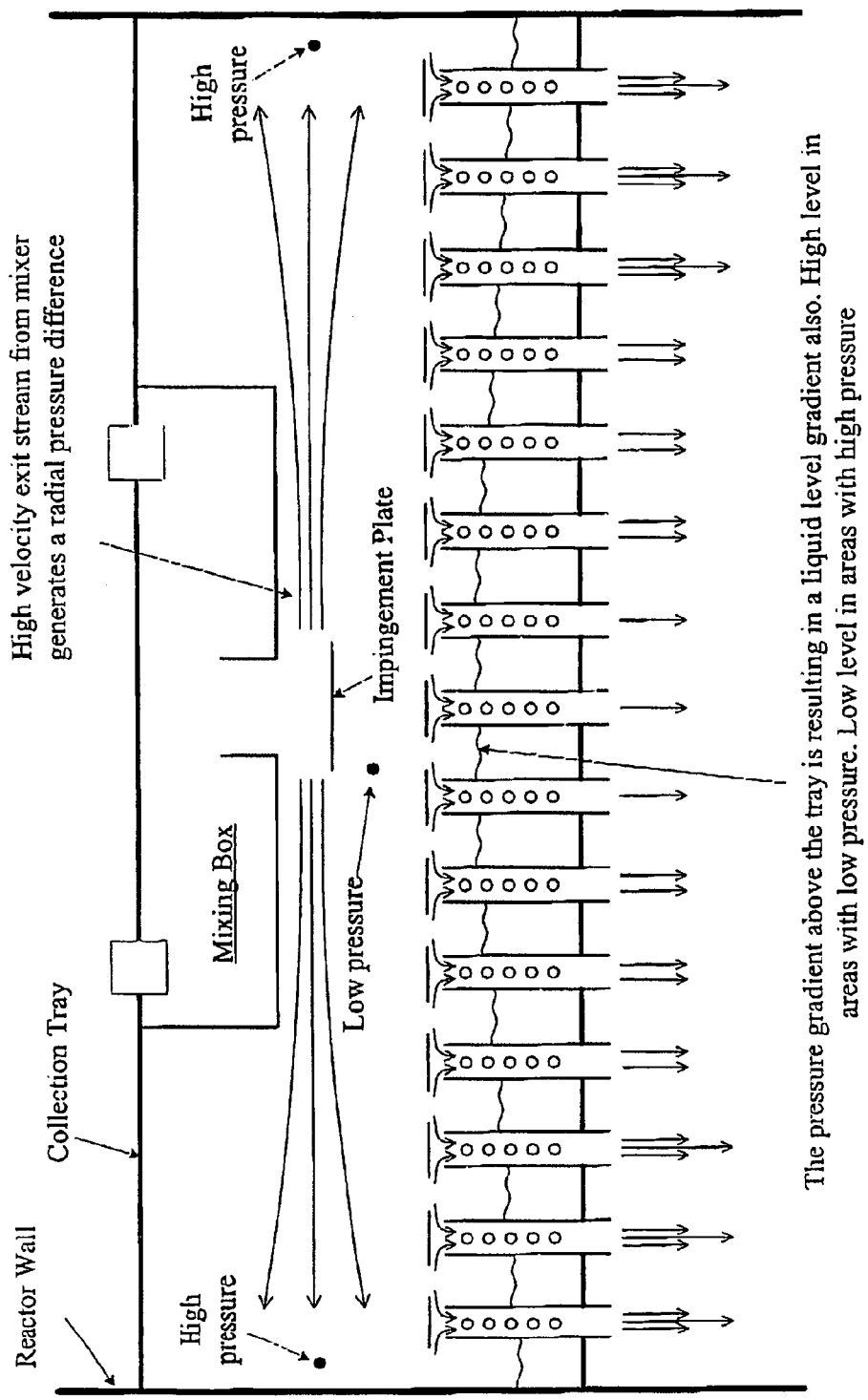
FIG. 12 is a diagrammatic illustration of the distribution of liquid levels in a reactor due to the pressure gradient in the vapor space above the distribution tray caused by the exit stream from an inter-bed mixer.

In all previous examples of the embodiment of the present invention, the distribution units on one distribution tray have all been identical. However different distribution units may be used on one distribution tray. In all previous examples of the embodiment of the present invention, the downcomer for vapor flow and the liquid conduit are parts of the same assembly or distribution unit. However the downcomer for vapor flow and the liquid conduits may be provided in separate assemblies or distribution units on the tray. FIGS. 8 and 9 represent an example of such a distribution tray.

FIG. 9 is a simplified view from above of a section of the distribution tray designed with separate downcomers and separate liquid conduits. FIG. 8A is a sectional view from above of one downcomer and one liquid conduit taken along segment A-A. FIG. 8A corresponds to the section of the distribution tray indicated with a dotted line in FIG. 9. FIG. 8B is a side sectional view of the distribution units taken along the segment B-B of FIG. 8A. FIG. 8C is a side sectional view of the liquid conduit taken along the segment C-C of FIG. 8A. FIG. 8D is a side sectional view of the downcomer taken along the segment D-D of FIG. 8A. Arrows in FIGS. 8B, 8C and 8D indicate the fluid flow path through the distribution units.

The distribution tray consists of a tray plate 120 provided with a plurality of liquid conduits 133 located on a square pitch on the tray plate. A plurality of downcomers 134 is provided as well, and these downcomers 134 are located on a square pitch with twice the spacing as the liquid conduits 133, so that the distances from one downcomer 134 to each of the four adjacent liquid conduits 133 are identical.

Each liquid conduit 133 consist of a circular pipe 121 fitted through a hole in the tray plate 120. In the upper end of the pipe 121, a vapor entrance is formed by one vertical cut of the two pipe walls along a diameter of pipe 121 and one horizontal cut. A circular cap 122 with same diameter as pipe 121 is concentrically attached to the upper semicircular edge of the pipe 121. In this way, a vapor inlet 128 to the liquid conduit 133 with a semi-cylindrical shape is formed. The pipe 121 is provided with six circular liquid openings 127 of different sizes. The liquid openings 127 are arranged in three vertical rows equally spaced along the circumference of the pipe 121. Two liquid openings are positioned in each of these three rows. An annular plate 125 is inserted in the outlet of the liquid conduit 133 to form a reduced flow area section or circular flow restriction 126. The joints between the pipe 121 and the tray plate 120 are essentially leak-tight.

Each downcomer 134 consists of a circular pipe 123 fitted through a hole in the tray plate 120. As for the liquid conduits 133, a vapor entrance is formed in the upper end of the pipe 123 by one vertical cut of the two pipe walls along a diameter of the pipe 123 and one horizontal cut. A circular cap 124 with same diameter as the pipe 123 is concentrically attached to the upper semicircular edge of the pipe 123. In this way, a vapor inlet 129 to the downcomer 134 with a semi-cylindrical shape is formed. The joints between the pipe 123 and the tray plate 120 are essentially leak-tight. During operation, the majority of vapor 131 flows through the vapor inlets 129 and the pipes 123. Liquid 130 flows through the fraction of the liquid openings 127 that is below a liquid level 132. The remaining vapor which did not enter vapor inlets 129 flows through the fraction of the openings 127 that is above the liquid level 132 and through the vapor inlets 128. The vapor and liquid flow downward inside the liquid conduit 133 and through the flow restriction 126, where it exits the distribution tray. The amount of vapor taking the path through the liquid conduits 133 adjusts itself until the total pressure drop through the liquid conduits 133 equals the total pressure drop for vapor flow through the downcomers 134. The purpose of the flow restriction 126 is to reduce the vapor flow through liquid conduits 133 and thus achieve a significantly lower flow velocity of the vapor entering the liquid conduit 133 than the vapor entering the downcomer 134. A low vapor entrance velocity to the liquid conduit 133 results in a low pressure drop from the outside vapor space 131 to the vapor space inside the liquid conduit 133, and thus a low maldistribution as defined in equation (1).

Due to the vapor flow through the vapor inlet 128 and through the dry fraction of the liquid openings 127, there is a minor pressure drop from outside the distribution unit to the vapor space inside the upper part of the liquid conduit 133. The distributor in FIGS. 8A-D and 9 will therefore, like the distributor in FIGS. 7A-D, show slightly increased maldistribution relative to the examples of the present invention given in FIGS. 2A-C, 3, 5A-C, and 6A-C, since the benefit of "Reason 1" mentioned above is reduced. Since the liquid openings 127 will pass the liquid into a vapor space in the pipe 121, the "Reason 2" for reduced maldistribution mentioned above is not relevant for the distribution tray in FIGS. 8A-D and 9.

In spite of these two drawbacks of the distribution units 133, 134 relative to the examples of the distribution units given in FIGS. 2A-C, 3, 5A-C, and 6A-C, the distribution units 133, 134 will still show improved performance relative to traditional chimney distribution trays, because the distribution units 133, 134 can be designed with a small cross sectional area and with high vapor flow velocities in the downcomer 134 without significantly increasing the maldistribution as defined in equation (1). The significant benefits of small distribution units have already been discussed above.

In some operating cases with high liquid flow and low vapor flow, a liquid level may build-up inside the pipe 121. In that case, no vapor is flowing through the liquid conduit 133 or the flow restriction 126.

The typical height of the distribution units is between 100 mm and 500 mm, and more preferably between 150 and 300 mm. The distributor density is typically 25 to 150 distribution units per square meter of tray, and more preferably 40 to 100 distribution units per square meter. A typical pitch of the distribution units on the tray is triangular or square. The total cross sectional area of the downcomers is typically between 1% and 10% of the tray area. The cross sectional area of each liquid conduit is typically between 150 mm$^2$ and 1500 mm$^2$. The cross sectional area of any reduced flow area section is typically between 20% and 100% of the downcomer cross sectional area.

In general terms the following may be noted regarding the invention:

The invention, generally, is a device for the even distribution of downwardly-flowing vapor and liquid across the cross section of a vessel in which the downward-flowing vapor and liquid is obstructed by an essentially horizontal tray that forces the vapor and liquid to flow through spaced-apart openings in the tray, wherein the spaced apart openings are connected to liquid conduits for transferring the majority of the liquid and to downcomers for transferring the majority of the vapor from above the tray plate and through the spaced-apart openings in the tray and where the vapor flow rate through the liquid conduits is minimized by one or both of the following two alternative methods:

Method 1:
The liquid conduit has at least one section with liquid flow in a generally upward direction to generate a liquid seal that prevents vapor flow through the liquid conduit other than vapor dissolved or entrained in the liquid during at least one operating mode of the tray.

Method 2:
The relative flow resistance of the liquid conduits and the downcomers is designed to limit the vapor flow through the liquid conduit so that the absolute pressure inside a liquid conduit in a given vertical elevation is higher than the absolute pressure inside a downcomer at the same vertical elevation for at least one vertical elevation and for at least one operating mode of the tray.

Preferably $(P_{sur}-P_{lc})/(P_{sur}-P_{vd})$ is less than 0.9, where $P_{sur}$ is the absolute pressure in the surrounding vapor space above the tray, $P_{lc}$ is the absolute pressure inside a liquid conduit in a given vertical elevation, and $P_{vd}$ is the absolute pressure inside a downcomer at the same vertical elevation. This means that the pressure drop for vapor entering the liquid downcomer is less than 90% of the pressure drop for vapor entering the downcomer.

Preferably, the general flow direction in the downcomers is downward. Preferably, there are no upward flow sections in the downcomers.

The minimum vapor flow velocity in the liquid conduit is less than the minimum vapor flow velocity in the downcomer for at least one operating mode. The minimum vapor velocity in the liquid conduit is preferably less than 75% of the minimum vapor velocity in the downcomer for at least one operating mode.

Preferably the total cross sectional area of all liquid conduits on the horizontal tray is smaller than the total cross sectional area of all downcomers on the horizontal tray. In a preferred embodiment, the downcomer has one or more reduced flow area sections with reduced flow area and increased flow velocity for increased dispersion of the liquid.

Means for improved liquid spread and dispersion, such as vanes, baffles, ribbons, corrugated plates, perforated plates or other inserts, can be used in the outlet of the downcomer. This function can also be provided by an impingement plate such, as a flat or curved plate with or without perforations used below the outlet of the downcomer.

A cap may be used above the downcomers to prevent direct liquid flow into the open upper end of the downcomer. A cap may be used above the liquid conduit to prevent direct liquid flow into the liquid conduit.

The downcomers may have open first ends in communication with a volume above the tray, and the liquid conduits may have one or more inlet openings in fluid communication with a volume above the tray, and one or more outlet openings in fluid communication with the downcomer. The inlet openings in the liquid conduit are positioned at an elevation that is lower than the open upper first end of the downcomer. In one embodiment, bypasses are fitted over or through a first array of the openings in the tray, and the downcomers are fitted over or through a second array of the openings in the tray.

What is claimed is:

1. A method for evenly distributing a downward flow of liquid and vapor across the cross sectional area of a two-phase concurrent downflow vessel below a substantially horizontal liquid collecting tray, the method comprising the steps of:
   collecting liquid in a liquid pool on said tray;
   collecting vapor in a vapor space above said liquid pool;
   providing a plurality of distribution units for conducting said vapor and said liquid downward through said tray, each of said distribution units comprising a downcomer, a liquid conduit and a vapor/liquid mixing zone;
   said downcomer having a vapor inlet located in said vapor space for conducting vapor from said vapor space through said vapor inlet to said vapor/liquid mixing zone; and
   said liquid conduit having a wall with one or more openings extending through said wall at different distances above said tray for conducting liquid from said liquid pool through said openings and to said vapor/liquid mixing zone, in which zone the vapor from said downcomer is combined with the liquid from said liquid conduit into one combined stream in said vapor/liquid mixing zone;

passing the majority of said vapor through said vapor inlets, through said downcomers and to said vapor/liquid mixing zones;

passing substantially all said liquid from said liquid pool through said one or more openings to said vapor/liquid mixing zones via said liquid conduits;

passing said vapor and said liquid from said vapor/liquid mixing zone to the space below said tray; and reducing the difference between the pressure of the vapor immediately above a surface of said liquid at a point adjacent said wall and upstream from one of said one or more openings, and the pressure of the vapor downstream from said one of said openings at the same level as said surface.

2. A method according to claim 1, wherein there is provided two or more openings extending through said wall at different distances above said tray.

3. A method according to either of claims 1 or 2, wherein said reduction of difference of pressure is obtained by constraining said liquid to flow upward through at least a portion of said liquid conduit to form a liquid seal before reaching said vapor/liquid mixing zone, thereby preventing vapor flow through said liquid conduit except for vapor entrained or dissolved in said liquid.

4. A method according to claim 3, wherein a flow restriction is provided downstream of said vapor/liquid mixing zone to increase the two-phase pressure drop from said vapor/liquid mixing zone to the space below said tray for reduction of the sensitivity to variations in liquid level on said tray of the liquid flow through one of said distribution units.

5. A method according to claim 4, wherein said two-phase pressure drop exceeds 50% of the total pressure drop from said vapor space above said tray to the vapor space below said tray.

6. A method according to claim 4, wherein said two-phase pressure drop exceeds 80% of the total pressure drop from said vapor space above said tray to the vapor space below said tray.

7. A method according to either of claims 1 or 2, wherein said reduction of difference of pressure is obtained by reducing the vapor flow through said liquid conduit by providing a flow obstruction at a location downstream of said openings and upstream of said vapor/liquid mixing zone.

8. A method according to claim 7, wherein the pressure drop across said flow obstruction exceeds 25% of the total pressure drop from said vapor space above said tray to said vapor/liquid mixing zone.

9. A method according to claim 7, wherein the pressure drop across said flow obstruction exceeds 50% of the total pressure drop from said vapor space above said tray to said vapor/liquid mixing zone.

10. A method according to claim 7, wherein the pressure drop across said flow obstruction exceeds 75% of the total pressure drop from said vapor space above said tray to said vapor/liquid mixing zone.

11. A method according to claim 1, wherein the general flow direction through said downcomer is downward.

12. A method according to claim 1, wherein both said liquid conduits and said downcomers in said distribution unit extend through said tray, and where said vapor/liquid mixing zone is the space below the tray plate.

13. A method according to claim 1, wherein said combined stream is dispersed and spread over a larger area by means for improved liquid spread and dispersion.

14. A method according to claim 1, wherein a cap is arranged above said vapor inlet in order to prevent direct flow of liquid from said vapor space into said vapor inlet.

15. A method according to claim 1, wherein the combined horizontal cross sectional area of all said liquid conduits on said tray is smaller than the combined horizontal cross sectional area of all said downcomers on said tray.

16. A method according to claim 1, wherein said vapor inlet is at a higher elevation than all said openings.

17. A device for evenly distributing a downward flow of liquid and vapor across the cross sectional area of a two-phase concurrent downflow vessel comprising:

a substantially horizontal liquid collecting tray for obstructing the downward-flowing vapor and liquid and for collecting the liquid in a liquid pool on said tray and the vapor in a vapor space above said liquid pool;

a plurality of distribution units for conducting said vapor and said liquid downward through said tray, each of said distribution units comprising a downcomer, a liquid conduit, a vapor/liquid mixing zone and a combined flow conduit, wherein:

said downcomer is provided with a vapor inlet at an upper end thereof and forms a flow channel from said vapor space through said vapor inlet to said vapor/liquid mixing zone for conducting the majority of said vapor from said vapor space to said vapor/liquid mixing zones;

said liquid conduit has a wall with one or more openings extending through said wall at different distances above said tray and forms a flow channel for liquid from said liquid pool through said opening and to said vapor/liquid mixing zone for conducting essentially all of the liquid from said liquid pool to said vapor/liquid mixing zones; and said combined flow conduit forms a flow channel from said vapor/liquid mixing zone to a location below said tray;

means for reducing the difference between the pressure of the vapor immediately above a surface of said liquid at a point adjacent said wall and upstream from one of said one or more openings, and the pressure of the vapor downstream from said one of said openings at the same level as said surface.

18. A device according to claim 17, wherein there is provided two or more liquid openings extending-through said wall at different distances above said tray.

19. A device according to either of claims 17 or 18, wherein said reduction of difference of pressure is obtained by at least a portion of said liquid conduit upstream of said vapor/liquid mixing zone extending upward in the direction from said liquid pool to said vapor/liquid mixing zone for constraining said liquid to flow upward through said portion of said liquid conduit to form a liquid seal before reaching said vapor/liquid mixing zone, thereby preventing vapor flow through said liquid conduit except for vapor entrained or dissolved in said liquid.

20. A device according to claim 19, wherein a flow restriction is provided downstream of said vapor/liquid mixing zone to increase the two-phase pressure drop from said vapor/liquid mixing zone to the space below said tray, for reduction of the sensitivity to variations in liquid level on said tray of the liquid flow through one of said distribution units.

21. A device according to claim 20, wherein the minimum flow area through said flow restriction is less than 80% of the flow area through said vapor/liquid mixing zone.

22. A device according to claim 20, wherein the minimum flow area through said flow restriction is less than 60% of the flow area through said vapor/liquid mixing zone.

23. A device according to claim 19, wherein said liquid conduit has all inlet openings thereof submerged in said liquid pool, thereby forming said liquid seal for preventing vapor entrance into said liquid conduit.

24. A device according to claim 19, wherein said openings are provided in a wall between said liquid conduit and said vapor/liquid mixing zone, thus forming the outlet from the liquid conduit.

25. A device according to either of claims 17 or 18, wherein said reduction in difference of pressure is obtained by providing a flow obstruction, at a location downstream of said liquid openings and upstream of said vapor/liquid mixing zone for reducing the vapor flow through said liquid conduit.

26. A device according to claim 25, wherein said openings are provided in a wall between said liquid pool and said liquid conduit, thus forming the liquid inlet to the liquid conduit.

27. A device according to claim 25, wherein said liquid conduit is provided with an inlet opening for vapor, located in said vapor space, in order to equalize the pressure across said wall to increase said reduction in difference of pressure.

28. A device according to claim 27, wherein a cap is provided above said inlet opening for vapor to prevent direct flow of liquid into said liquid conduit through said inlet opening for vapor.

29. A device according to claim 25, wherein the minimum flow area through said flow obstruction is less than 80% of the inner cross sectional area of said liquid conduit.

30. A device according to claim 25, wherein the minimum flow area through said flow obstruction is less than 60% of the inner cross sectional area of said liquid conduit.

31. A device according to claim 25, wherein the minimum flow area through said flow obstruction is less than 50% of the inner cross sectional area of said liquid conduit.

32. A device according to either of claims 17 or 18, wherein the general flow direction through the downcomer is downward.

33. A device according to either of claims 17 or 18, wherein both said liquid conduits and said downcomers in said distribution unit extend through said tray, and where said vapor/liquid mixing zone is the space below the tray plate, and where said combined flow conduit is a section of said two-phase concurrent downflow vessel below said tray.

34. A device according to either of claims 17 or 18, wherein means for improved liquid spread and dispersion are provided downstream from or in said combined flow conduit to improve the local spread and distribution of the liquid and vapor exiting said distribution unit.

35. A device according to either of claims 17 or 18, wherein a cap is arranged above said vapor inlet in order to prevent direct flow of liquid from said vapor space through said vapor inlet and into said downcomer.

36. A device according to either of claims 17 or 18, wherein the combined horizontal cross sectional area of all said liquid conduits on said tray is smaller than the combined horizontal cross sectional area of all said downcomers on said tray.

37. A device according to either of claims 17 or 18, wherein said vapor inlet is at a higher elevation than all said openings.

38. A device according to either of claims 17 or 18, wherein distribution units of different construction are used on one tray.

39. A device according to either of claims 17 or 18, wherein two or more of said liquid conduits are used in said distribution unit.

40. A device according to either of claims 17 or 18, wherein two or more of said downcomers are used in said distribution unit.

41. A device for evenly distributing a downward flow of liquid and vapor across the cross sectional area of a two-phase concurrent downflow vessel, said device comprising:
a substantially horizontal liquid collecting tray for obstructing the downward flowing vapor and liquid and for collecting said liquid in a liquid pool on said tray with said vapor in a vapor space above said liquid pool;
a plurality of distribution units for conducting said vapor and said liquid through said tray, each of said distribution units comprising:
a downcomer extending through said tray from said vapor space to a lower space below said tray, said downcomer comprising a vapor inlet located at a first distance above said tray larger than the normal maximum depth of said liquid pool such that said vapor inlet normally is located in said vapor space, and a vapor/liquid outlet located below said tray in said lower space; and
a liquid conduit having a wall portion, comprising a liquid inlet located at a second distance above said tray smaller than the normal minimum depth of said liquid pool such that said liquid inlet normally is located below the surface of said liquid pool, and one or more liquid outlets located above said liquid inlet and communicating with corresponding openings in a wall portion of said downcomer.

42. A device according to claim 41, wherein two or more liquid outlets are located at mutually different distances above said tray.

43. A device according to either of claims 41 or 42, wherein said downcomer is provided with a flow restriction located downstream from at least one of said openings.

44. A device according to either of claims 41 or 42, wherein said wall portion of said downcomer constitutes said wall portion of said liquid conduit.

* * * * *